(12) United States Patent
Oh

(10) Patent No.: US 12,007,037 B2
(45) Date of Patent: Jun. 11, 2024

(54) MULTI-WAY REFRIGERANT VALVE AND HEAT PUMP SYSTEM HAVING THE SAME

(71) Applicants: HYUNDAI MOTOR COMPANY, Seoul (KR); KIA CORPORATION, Seoul (KR)

(72) Inventor: Seoyoung Oh, Uijeongbu-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 280 days.

(21) Appl. No.: 17/726,136

(22) Filed: Apr. 21, 2022

(65) Prior Publication Data

US 2023/0204119 A1 Jun. 29, 2023

(30) Foreign Application Priority Data

Dec. 28, 2021 (KR) .................. 10-2021-0190013

(51) Int. Cl.
*F16K 11/074* (2006.01)
*B60H 1/00* (2006.01)
(Continued)

(52) U.S. Cl.
CPC ....... *F16K 31/041* (2013.01); *B60H 1/00485* (2013.01); *F15B 13/02* (2013.01); *F16K 11/074* (2013.01); *F16K 27/04* (2013.01); *B60H 1/00921* (2013.01); *B60H 2001/00935* (2013.01); *B60K 2001/003* (2013.01); *B60K 2001/005* (2013.01); *B60K 2001/006* (2013.01); *F16K 11/08* (2013.01); *F16K 27/06* (2013.01);
(Continued)

(58) Field of Classification Search
CPC ........ F16K 11/074; F16K 27/04; F16K 11/08; F16K 27/06; B60H 2001/00935; B60H 1/00485; B60H 1/00921; B60K 2001/003; B60K 2001/005; B60K 2001/006; F25B 41/20; F25B 5/02; F25B 6/02; F25B 2339/047

See application file for complete search history.

(56) References Cited

U.S. PATENT DOCUMENTS 5,881,403 A * 3/1999 Moreland ........... F16K 11/0853
4/541.1
6,311,728 B1 * 11/2001 Goettl ................... F16K 11/074
137/627

(Continued)

*Primary Examiner* — Matthew W Jellett
*Assistant Examiner* — Christopher D Ballman
(74) *Attorney, Agent, or Firm* — MCDONNELL BOEHNEN HULBERT & BERGHOFF LLP

(57) ABSTRACT

A multi-way refrigerant valve includes an outer housing having an open surface, and in which a first inlet, a second inlet, and a third inlet, and a first outlet, a second outlet, a third outlet, a fourth outlet, a fifth outlet, and a sixth outlet are formed, an inner housing rotatable inside the outer housing to connect the inlets and the outlets, and including at least one connection flow path formed therein, and a cover member mounted to the open surface of the outer housing. As the inner housing is rotated at a predetermined interval by the driving unit, the first inlet is connected to one or both of the first outlet or the second outlet, the second inlet is connected to one of the third outlet or the fourth outlet, and the third inlet is connected to one or both of the fifth outlet and or the sixth outlet.

22 Claims, 13 Drawing Sheets

(51) Int. Cl.
   *F15B 13/02*   (2006.01)
   *F16K 27/04*   (2006.01)
   *F16K 31/04*   (2006.01)
   *B60K 1/00*    (2006.01)
   *F16K 11/08*   (2006.01)
   *F16K 27/06*   (2006.01)
   *F25B 5/02*    (2006.01)
   *F25B 6/02*    (2006.01)
   *F25B 41/20*   (2021.01)

(52) U.S. Cl.
   CPC . *F25B 5/02* (2013.01); *F25B 6/02* (2013.01); *F25B 41/20* (2021.01); *F25B 2339/047* (2013.01)

(56) References Cited

U.S. PATENT DOCUMENTS

| | | | | |
|---|---|---|---|---|
| 8,714,182 | B2* | 5/2014 | Malinasky, Jr. | B05B 3/16 |
| | | | | 137/119.07 |
| 9,625,041 | B1* | 4/2017 | Lopez | F16K 31/535 |
| 9,649,909 | B2* | 5/2017 | Enomoto | B60W 10/30 |
| 10,371,420 | B2* | 8/2019 | Katoh | B60H 1/00899 |
| 10,731,774 | B2* | 8/2020 | Taylor | E04H 4/1236 |
| 11,719,349 | B2* | 8/2023 | Bryant | F25B 41/31 |
| | | | | 137/625.48 |
| 2015/0000327 | A1* | 1/2015 | Kakehashi | H01M 10/625 |
| | | | | 62/434 |
| 2016/0167481 | A1* | 6/2016 | Makihara | B60H 1/03 |
| | | | | 237/5 |

* cited by examiner

MULTI-WAY REFRIGERANT VALVE AND HEAT PUMP SYSTEM HAVING THE SAME

CROSS REFERENCE TO RELATED APPLICATIONS

This application claims priority to and the benefit of Korean Patent Application No. 10-2021-0190013 filed in the Korean Intellectual Property Office on Dec. 28, 2021, the entire contents of which are incorporated herein by reference.

BACKGROUND

(a) Field

The present disclosure relates to a multi-way refrigerant valve and a heat pump system having the same. More particularly, the present disclosure relates to a multi-way refrigerant valve for forming a plurality of refrigerant flow paths to simplify a configuration and to a heat pump system having the same.

(b) Description of the Related Art

Generally, an air condition system for a vehicle includes an air conditioner device circulating a refrigerant in order to heat or cool an interior of the vehicle.

The air conditioner device, which is to maintain the interior of the vehicle at an appropriate temperature regardless of a change in an external temperature to maintain a comfortable interior environment, is configured to heat or cool the interior of the vehicle by heat exchange by an evaporator in a process in which a refrigerant discharged by driving of a compressor is circulated to the compressor through a condenser, a receiver drier, an expansion valve, and the evaporator.

That is, the air conditioner device lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Recently, as interest in energy efficiency and an environmental contamination problem are increased day by day, there is a need for developing an environmentally friendly vehicle that is capable of substantially replacing an internal combustion engine vehicle, and the environmentally friendly vehicle is commonly divided into an electric vehicle that is driven by using a fuel cell or electricity as a power source and a hybrid vehicle that is driven by using an engine and an electric battery.

In the electric vehicle or the hybrid vehicle among these environmentally friendly vehicles, a separate heater is not used, unlike an air conditioner of a general vehicle, and an air conditioner used in the environmentally friendly vehicle is generally called a heat pump system.

Meanwhile, the electric vehicle generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling apparatus and a battery cooling apparatus should be configured using separate closed circuits, respectively, so as to prevent heat generation of the motor, an electrical component, and the battery including the fuel cells along with the heat pump system.

Therefore, there are drawbacks that the size and weight of the cooling module disposed in front of the vehicle increases, and the layout of the connecting pipes that supply the refrigerator or coolant to the heat pump system, the cooling apparatus, and the battery cooling apparatus in a narrow space becomes complicated.

In addition, in the conventional heat pump system, since a plurality of refrigerant valves to control the flow of the refrigerant and selectively expand the refrigerant must be applied, there are also drawbacks that the overall manufacturing cost increases and it is difficult to secure the mount space.

The above information disclosed in this Background section is only for enhancement of understanding of the background of the disclosure, and therefore it may contain information that does not form the prior art that is already known in this country to a person of ordinary skill in the art.

SUMMARY

Therefore, the present disclosure is invented to solve the problem as described above, and an object to be solved by the present disclosure is intended to provide a multi-way refrigerant valve that may simplify a layout of a system and reduce a manufacturing cost by forming a plurality of refrigerant flow paths through one refrigerant valve and a heat pump system having the same.

In addition, another object of the present disclosure is to provide a multi-way refrigerant valve that may form a plurality of refrigerant flow paths according to a selected mode of the vehicle in one refrigerant valve through simple control and a heat pump system having the same.

A multi-way refrigerant valve according to an embodiment of the present disclosure includes an outer housing of which one surface is opened, and in which a first inlet, a second inlet, and a third inlet, and a first outlet, a second outlet, a third outlet, a fourth outlet, a fifth outlet, and a sixth outlet are formed, an inner housing provided to be rotatable inside the outer housing to selectively connect the first, second, and third inlets and the first, second, third, fourth, fifth, and sixth outlets and including at least one connection flow path formed inside, and a cover member mounted to one opened surface of the outer housing. As the inner housing is rotated at a predetermined interval by a driving unit operated in at least one selected mode, the first inlet is selectively connected to any one or both of the first outlet and the second outlet, the second inlet is selectively connected to any one of the third outlet and the fourth outlet, and the third inlet is selectively connected to one of the fifth outlet or the sixth outlet, either one, or both.

The outer housing may further include a plurality of chambers communicated with the first to third inlets and the first to sixth outlets along the circumferential direction, respectively, and partitioned through a partition wall.

A plurality of the chambers may include first to third inlet chambers formed in the outer housing respectively corresponding to the first to third inlets, and first to sixth outlet chambers respectively formed in the outer housing corresponding to the first to sixth outlets, and the first to third inlet chambers and the first to sixth outlet chambers may be communicated with a plurality of connection holes formed along the interior circumference of the outer housing by corresponding to a plurality of connection flow paths.

An orifice for selectively expanding refrigerant flowing from the connection flow paths may be formed in at least one outlet chamber among the first to sixth outlet chambers.

The first outlet and the second outlet may be respectively disposed on both sides of the outer housing in the circumferential direction based on the first inlet, the second outlet and the third outlet may be respectively disposed on both sides of the outer housing in the circumferential direction based on the second inlet, the fourth outlet and the fifth outlet may be respectively disposed on both sides of the outer housing in the circumferential direction based on the third inlet, the third outlet and the fourth outlet may be disposed adjacently along the circumferential direction of the outer housing, and the fifth outlet, the sixth outlet, and the second outlet may be sequentially disposed adjacently along the circumferential direction of the outer housing.

A plurality of connection flow paths may include a first connection flow path selectively connecting the first inlet chamber and the first outlet chamber, a second connection flow path selectively connecting the first inlet chamber and the second outlet chamber, a third connection flow path selectively connecting the second inlet chamber and the third outlet chamber, a fourth connection flow path including one end connected to the third connection flow path and the other end selectively connected to the fourth outlet chamber, a fifth connection flow path selectively connecting the third inlet chamber and the fifth outlet chamber, and a sixth connection flow path including one end connected to the fifth connection flow path and the other end selectively connected to the sixth outlet chamber.

The mode may include a first mode to a fourth mode in which the inner housing rotates at a predetermined angle inside the outer housing.

In the first mode, the first inlet may be connected to the second outlet through the second connection flow path, the second inlet may be connected to the third outlet through the third connection flow path, the third inlet may be connected to the sixth outlet through the fifth connection flow path and the sixth connection flow path, and the first outlet, the fourth outlet, and the fifth outlet may be closed.

In the second mode, the first inlet may be connected to the second outlet through the second connection flow path, the second inlet may be connected to the third outlet through the third connection flow path, the third inlet may be respectively connected to the fifth outlet and the sixth outlet through the fifth connection flow path and the sixth connection flow path, and the first outlet and the fourth outlet may be closed.

In the third mode, the first inlet may be connected to the second outlet through the second connection flow path, the second inlet may be connected to the fourth outlet through the third connection flow path and the fourth connection flow path, and the first outlet, the third outlet, the fifth outlet and the sixth outlet may be closed.

In the fourth mode, the first inlet may connect the first connection flow path and the second connection flow path to the first outlet and the second outlet, the second inlet may be connected to the fourth outlet through the third connection flow path and the fourth connection flow path, and the third outlet, the fifth outlet, and the sixth outlet may be closed.

A seal member may be interposed between the outer housing and the inner housing to prevent the refrigerant from leaking between the outer housing and the inner housing.

At least one flow rate control apparatus for controlling the flow rate of the refrigerant exhausted to the outside from at least one of the first to sixth outlets may be provided in the outer housing.

At least one flow rate control apparatus may be respectively provided in the first outlet, the second outlet, the fifth outlet, and the sixth outlet.

A driving unit connected to the rotation center of the inner housing and selectively rotating the inner housing inside the outer housing may be further included.

A heat pump system including a multi-way refrigerant valve according to an embodiment of the present disclosure includes a first cooling apparatus including a first radiator and a first water pump connected by the first coolant line and circulating a coolant in the first coolant line to cool at least one electrical component and at least one motor, a second cooling apparatus including a second water pump connected to the second coolant line and circulating a coolant in the second coolant line, a battery module provided in a battery coolant line that is selectively connected to the second coolant line through the first valve, an air conditioner device circulating the refrigerant in a refrigerant line and including a multi-way refrigerant valve, and a chiller provided on the battery coolant line to pass the coolant, connected to the multi-way refrigerant valve through a refrigerant connection line, and heat-exchanging the selectively inflowing coolant with the refrigerant supplied from the multi-way refrigerant valve to adjust a temperature of the coolant. The heat exchanger provided in the air conditioner device is respectively connected to the first and second coolant lines so that the coolant circulating in the first and second cooling apparatus passes therethrough, respectively, and the inner housing provided in the multi-way refrigerant valve operates in a first mode to a fourth mode and that rotates at a predetermined angle inside the outer housing.

The air conditioner device may include an HVAC module connected from the multi-way refrigerant valve through the refrigerant line and including an opening/closing door provided inside so that the outdoor air passing through the evaporator is controlled to selectively inflow to the internal condenser according to a cooling, heating, and dehumidifying mode of the vehicle, a sub-condenser connected to the multi-way refrigerant valve through the refrigerant line, a compressor connected between the evaporator and the internal condenser through the refrigerant line, a bypass line selectively connecting the multi-way refrigerant valve and the compressor, and a dehumidifying line connecting the refrigerant line connecting the multi-way refrigerant valve and the evaporator, and the multi-way refrigerant valve, so that the refrigerant passing through the internal condenser selectively inflows from the multi-way refrigerant valve to the evaporator, and when the heat exchanger condenses the refrigerant, the sub-condenser may receive the refrigerant condensed in the heat exchanger from the multi-way refrigerant valve and additionally condense the refrigerant through the heat-exchange with the outdoor air.

In the first mode, the multi-way refrigerant valve may close the refrigerant connection line, the bypass line, and the dehumidifying line, and open the refrigerant line so that the refrigerant supplied from the compressor to the internal condenser passes through the heat exchanger, the sub-condenser, and the evaporator and again inflows to the compressor.

In the second mode, the multi-way refrigerant valve may open the refrigerant connection line, close the bypass line and the dehumidifying line, and open the refrigerant line, so that the refrigerant supplied from the compressor to the internal condenser passes through the heat exchanger, the sub-condenser, and the evaporator and again inflows to the compressor, and expand the refrigerant exhausted to the refrigerant connection line to inflow to the chiller.

In the third mode, the multi-way refrigerant valve may close the refrigerant connection line and the dehumidifying line, open the bypass line, and open the refrigerant line except for the refrigerant line respectively connected to the evaporator and the sub-condenser, so that the refrigerant supplied from the compressor to the internal condenser passes through the heat exchanger and inflows back to the compressor, and expand the refrigerant exhausted to the refrigerant line connected to the heat exchanger to inflow it to the heat exchanger.

In the fourth mode, the multi-way refrigerant valve may close the refrigerant connection line, open the bypass line and the dehumidifying line, and open the remaining refrigerant line except for the refrigerant line connected to the evaporator and the sub-condenser so that the refrigerant supplied from the compressor to the internal condenser passes through the heat exchanger and again inflows to the compressor, and expand the refrigerant exhausted to the refrigerant line connected to the heat exchanger to inflow it to the heat exchanger.

The refrigerant supplied to the dehumidifying line may be supplied to the compressor after passing through the evaporator along the refrigerant line connected to the evaporator, and the multi-way refrigerant valve may expand the refrigerant that is exhausted into the dehumidifying line so that the refrigerant expanded through the opened dehumidifying line and the dehumidifying line and connected to the refrigerant line is supplied to the evaporator.

Accordingly, the multi-way refrigerant valve forms a plurality of refrigerant flow paths to which the refrigerant flows between the outer housing and the inner housing by the rotation of the inner housing according to the mode of the vehicle through each operation of the first mode to the fourth mode, thereby minimizing the number of expansion valves and refrigerant valves applied to the conventional heat pump system and promoting the simplification of the heat pump system.

In addition, the present disclosure may facilitate the control of the refrigerant valve because a plurality of refrigerant flow paths are formed between the outer housing and the inner housing while the inner housing rotates at a predetermined angular interval.

Furthermore, through the simplification of the entire system, it is possible to reduce a manufacturing cost and a weight, and improve space utilization.

BRIEF DESCRIPTION OF THE FIGURES

The present disclosure will become more fully understood from the detailed description given hereinbelow and the accompanying drawings, which are given by illustration only, and thus are not limitative of the present disclosure.

DETAILED DESCRIPTION

Figure 1:
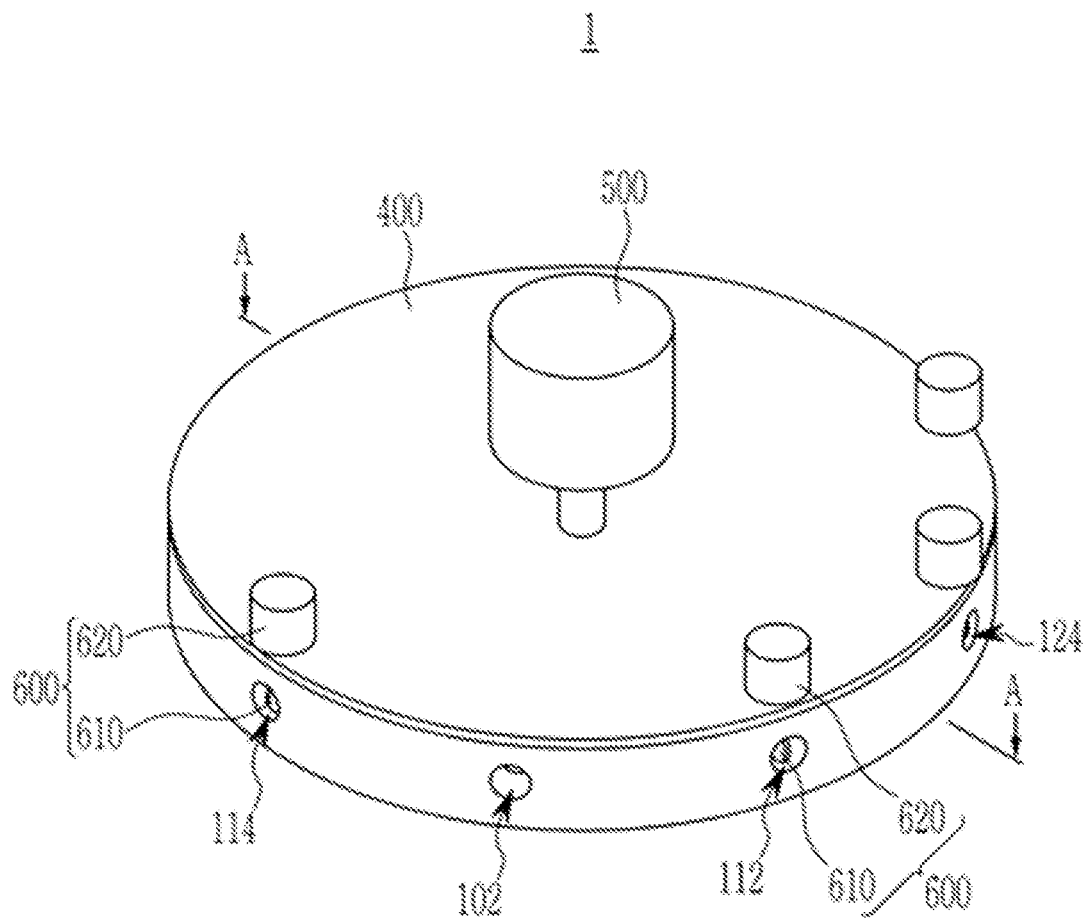
FIG. 1 is a perspective view of a multi-way refrigerant valve according to an embodiment of the present disclosure.

An embodiment of the present disclosure will hereinafter be described in detail with reference to the accompanying drawings.

Embodiments described in the present specification and a configuration shown in the drawings are just the most preferable embodiments of the present disclosure, but are not limited to the spirit and scope of the present disclosure. Therefore, it should be understood that there may be various equivalents and modifications capable of replacing them at the time of filing of the present application.

In order to clarify the present disclosure, parts that are not connected with the description will be omitted, and the same elements or equivalents are referred to as the same reference numerals throughout the specification.

The size and thickness of each element are arbitrarily shown in the drawings, and the present disclosure is not necessarily limited thereto, and in the drawings, the thickness of layers, films, panels, regions, etc., are exaggerated for clarity.

In addition, unless explicitly described to the contrary, the word "comprise", and variations such as "comprises" or "comprising", will be understood to imply the inclusion of stated elements but not the exclusion of any other elements.

Further, the terms, " . . . unit", " . . . mechanism", " . . . portion", " . . . member", etc. used herein mean the unit of inclusive components performing at least one or more functions or operations.

Figure 2:
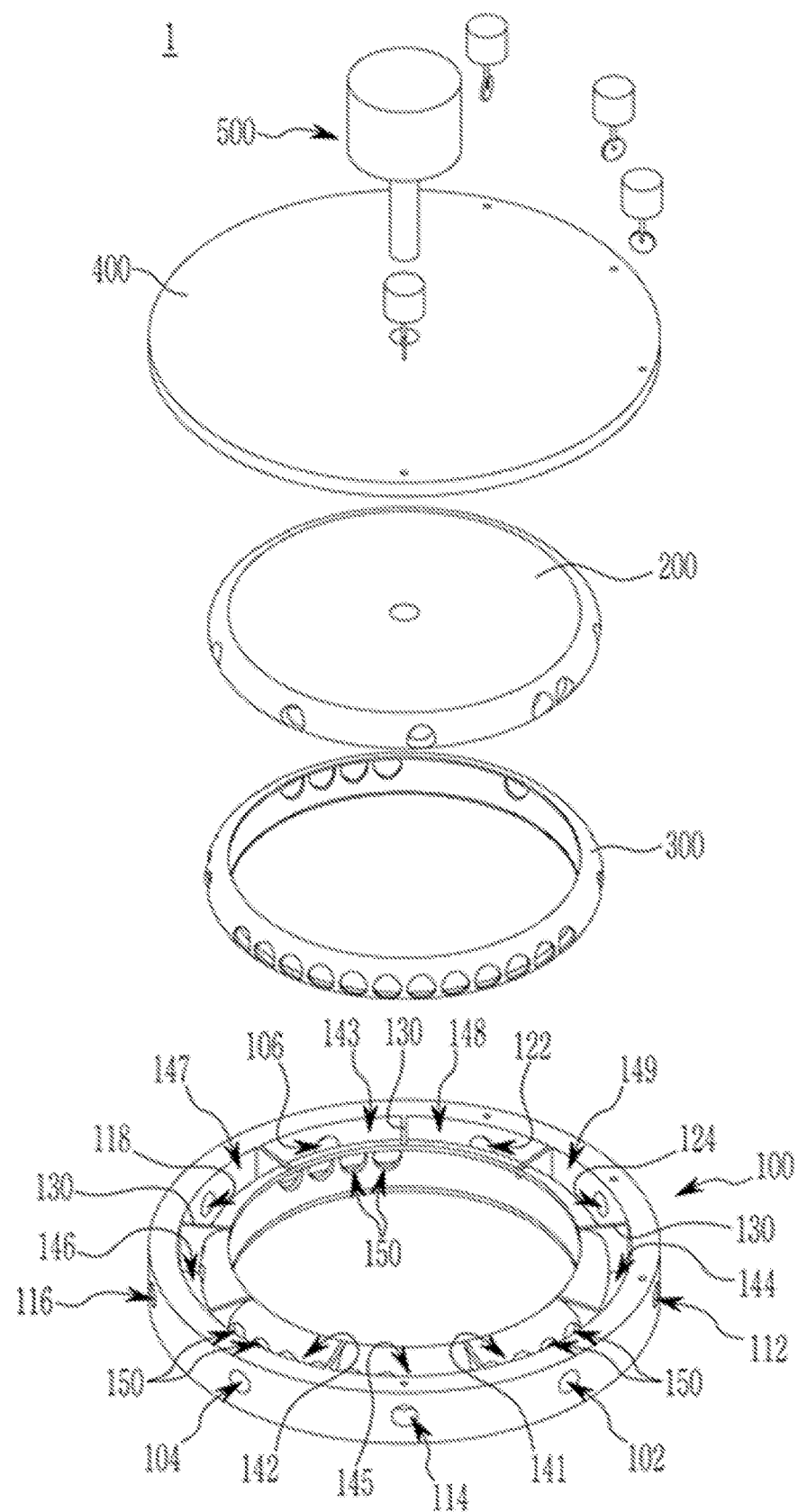
FIG. 2 is an exploded perspective view of a multi-way refrigerant valve according to an embodiment of the present disclosure.
Figure 3:
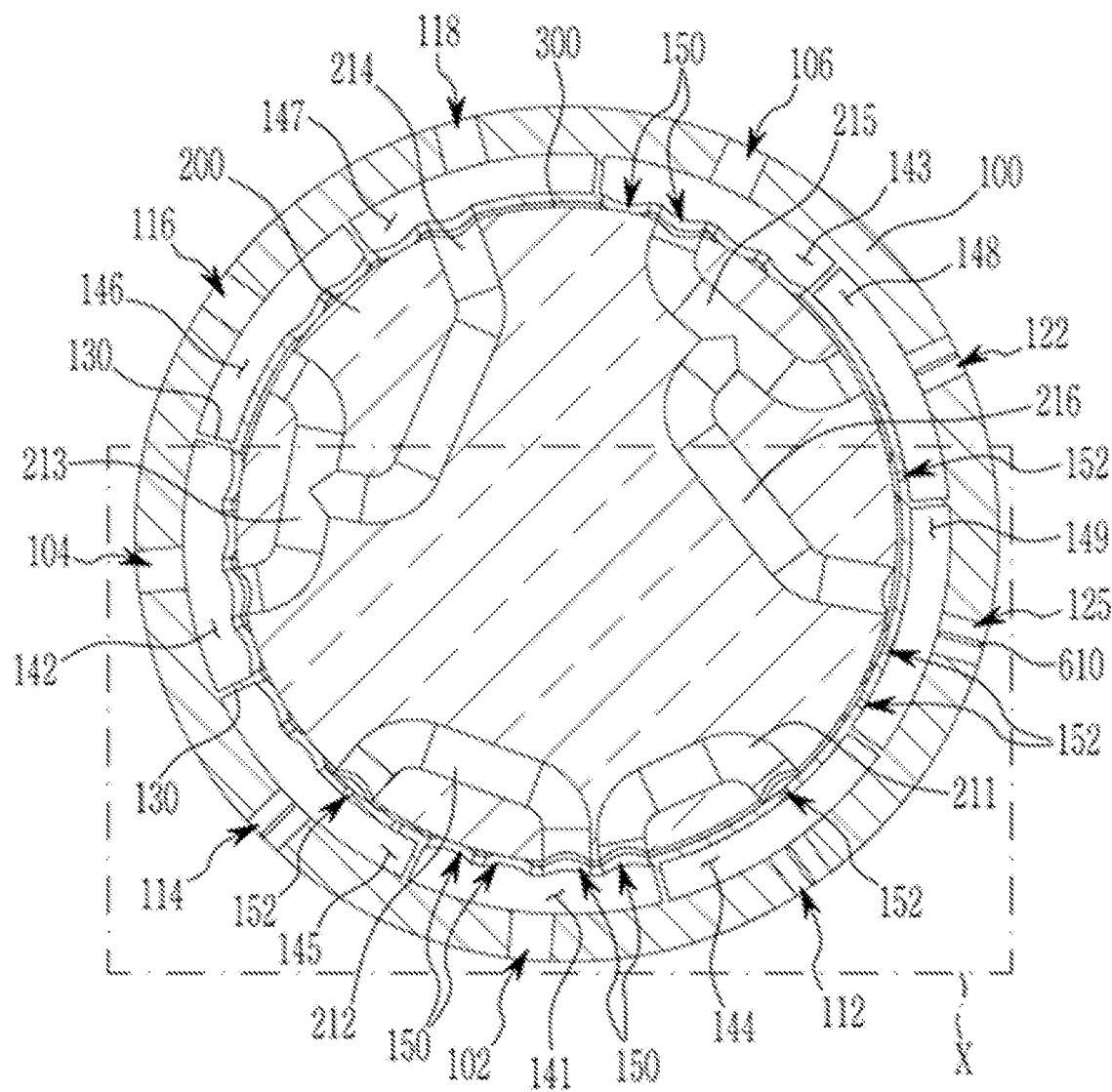
FIG. 3 is a cross-sectional view taken along a line A-A of FIG. 1.
Figure 4:
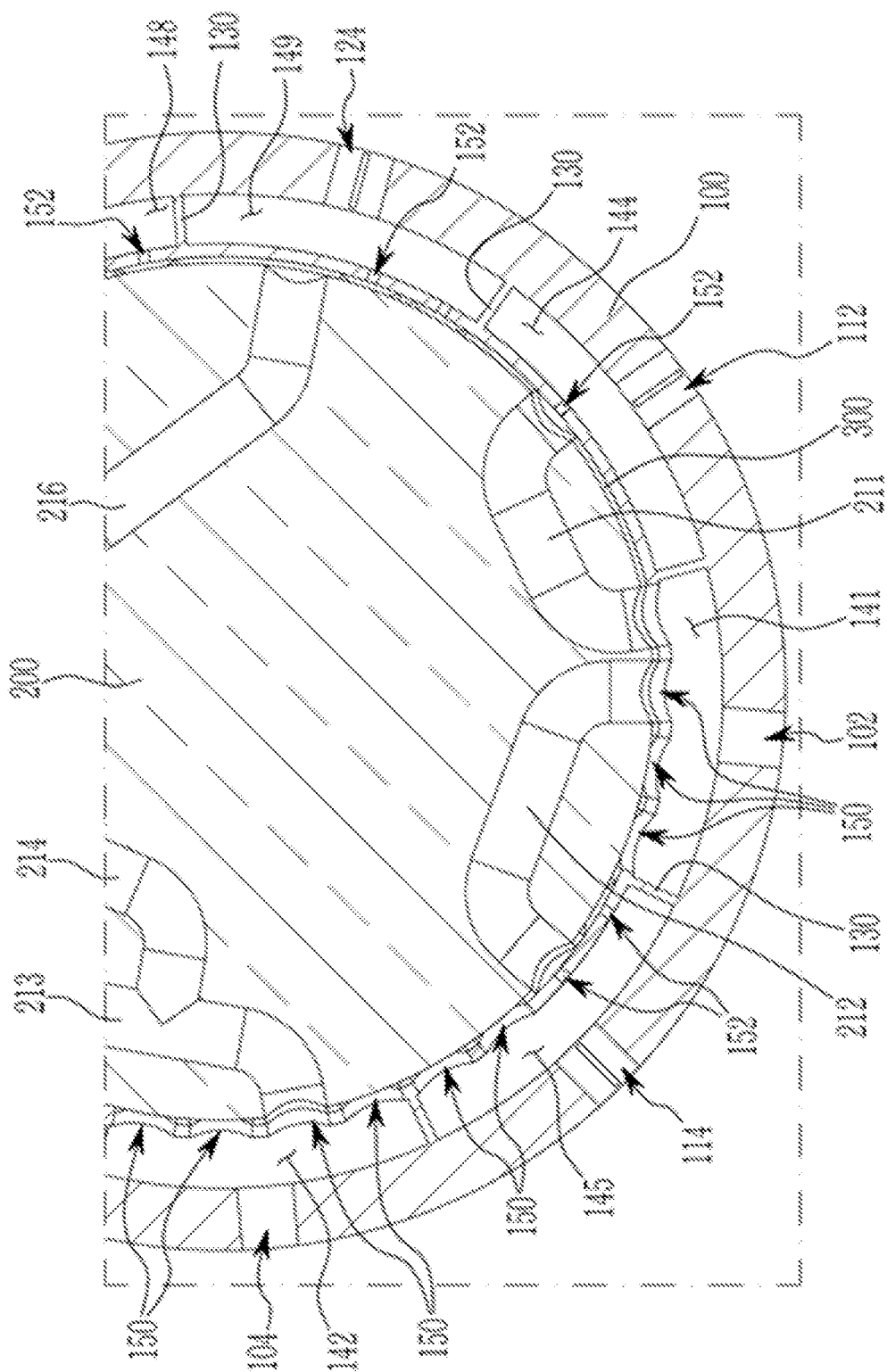
FIG. 4 is an enlarged view of a portion X of FIG. 3.

FIG. 1 is a perspective view of a multi-way refrigerant valve according to an embodiment of the present disclosure, FIG. 2 is an exploded perspective view of a multi-way refrigerant valve according to an embodiment of the present disclosure, FIG. 3 is a cross-sectional view taken along a line A-A of FIG. 1, and FIG. 4 is an enlarged view of a portion X of FIG. 3.

Referring to FIG. 1 to FIG. 4, a multi-way refrigerant valve 1 according to an embodiment of the present disclosure may include an outer housing 100, an inner housing 200 provided to be rotatable inside the outer housing 100, a cover member 400, and a driving unit 500.

First, the outer housing 100 may be formed in a cylinder shape of which one surface is open.

In this outer housing 100, a first inlet 102, a second inlet 104, a third inlet 106, a first outlet 112, a second outlet 114, a third outlet 116, a fourth outlet 118, a fifth outlet 122, and a sixth outlet 124, which are communicated with the inside along the circumference of the exterior circumference, may be formed.

In the present embodiment, the first to third inlets 102, 104, and 106 and the first to sixth outlets 112, 114, 116, 118, 122, and 124 may be formed at positions spaced by an angle of 40° to the circumferential direction of the outer housing 100.

In addition, the first inlet 102 may be connected to an internal condenser 52a provided in an air conditioner device 50 to be described later through a refrigerant line 51. That is, in the first inlet 102, a refrigerant exhausted from the internal condenser 52a may inflow through the refrigerant line 51.

The second inlet 104 may be connected to the heat exchanger 54 provided in the air conditioner device 50 through the refrigerant line 51. In this second inlet 104, the refrigerant exhausted from the heat exchanger 54 may flow in through the refrigerant line 51.

The third inlet 106 may be connected to a sub-condenser 56 provided in the air conditioner device 50 through the refrigerant line 51. In this third inlet 106, the refrigerant exhausted from the sub-condenser 56 can be inflowed through the refrigerant line 51.

The first outlet 112 may be connected to an evaporator 58 provided in the air conditioner device 50 through a dehumidifying line 62. That is, the refrigerant exhausted from the first outlet 112 is exhausted to the dehumidifying line 62, and may be supplied to the evaporator 58 connected to the dehumidifying line 62 through the refrigerant line 51.

The second outlet 114 may be connected to the heat exchanger 54 through the refrigerant line 51. That is, the refrigerant exhausted through the second outlet 114 may be supplied to the heat exchanger 54 through the refrigerant line 51.

The third outlet 116 may be connected to the sub-condenser 56 through the refrigerant line 51. That is, the refrigerant exhausted to the third outlet 116 may be supplied to the sub-condenser 56 through the refrigerant line 51.

The fourth outlet 118 may be connected through a bypass line 64 provided in the air conditioner device 50.

The fifth outlet 122 may be connected to a chiller 70 via the refrigerant connection line 66. That is, the refrigerant exhausted through the fifth outlet 122 may be supplied to the chiller 70 through the refrigerant connection line 66.

Also, the sixth outlet 124 may be connected to the evaporator 58 through the refrigerant line 51. That is, the refrigerant exhausted through the sixth outlet 124 may be supplied to the evaporator 58 through the refrigerant line 51.

Meanwhile, in the present embodiment, the first inlet 102, the second inlet 104, and the third inlet 106 may be disposed alternately with at least one outlet among the first to sixth outlets 112, 114, 116, 118, 122, and 124 along the circumferential direction of the outer housing 100.

That is, based on the first inlet 102, the first outlet 112 and the second outlet 114 may be disposed on both sides of the outer housing 100 in the circumferential direction with the first inlet 102 interposed therebetween.

Based on the second inlet 104, the second outlet 114 and the third outlet 116 may be disposed on both sides of the outer housing 100 in the circumferential direction with the second inlet 104 interposed therebetween.

Based on the third inlet 106, the fourth outlet 118 and the fifth outlet 122 may be disposed on both sides of the outer housing 100 in the circumferential direction with the third inlet 106 interposed therebetween.

Here, the third outlet 116 and the fourth outlet 118 may be disposed adjacent along the circumferential direction of the outer housing 100.

In addition, the fifth outlet 122, the sixth outlet 124 and the second outlet 114 may be disposed sequentially adjacent to each other along the circumferential direction of the outer housing 100.

On the other hand, the outer housing 100 may further include a plurality of chambers 140, which are respectively communicated with the first to third inlets 102, 104, and 106, and the first to sixth outlets 112, 114, 116, 118, 122, and 124 along the circumferential direction and respectively partitioned through a partition wall 130.

A plurality of the chambers 140 includes first, second, and third inlet chambers 141, 142, and 143, and first, second, third, fourth, fifth, and sixth outlet chambers 144, 145, 146, 147, 148, and 149.

First, the first to third inlet chambers 141, 142, and 143 may be formed in the outer housing 100 corresponding to the first to third inlets 102, 104, and 106, respectively.

Also, the first to sixth outlet chambers 144, 145, 146, 147, 148, and 149 may be respectively formed in the outer housing 100 to correspond to the first to sixth outlets 112, 114, 116, 118, 122, and 124.

Here, the partition walls 130 may prevent the refrigerant inflowing into each chamber 140 from mixing by partitioning the first to third inlet chambers 141, 142, and 143 and the first to sixth outlet chambers 144, 145, 146, 147, 148, and 149, respectively.

Also, the first to third inlet chambers 141, 142, and 143 and the first to sixth outlet chambers 144, 145, 146, 147, 148, and 149 may be communicated with a plurality of connection holes 150 formed along the interior circumference of the outer housing 100 by corresponding to a plurality of connection flow paths 211, 212, 213, 214, 215, and 216 formed in the inner housing 200.

Here, the connection holes 150 are continuously formed at 10° angular intervals along the circumference of the interior circumference of the outer housing 100 in the section where each of the chambers 140 are positioned, or at least one is intermittently placed at a predetermined position, respectively.

That is, the connection flow paths selectively connect any one of the first to third inlet chambers 141, 142, and 143 through the connection holes 150 to any one of the first to sixth outlet chambers 144, 145, 146, 147, 148, and 149.

Accordingly, the flow of the refrigerant inflowed to the multi-way refrigerant valve may be controlled.

On the other hand, in the present embodiment, among the first to sixth outlet chambers 144, 145, 146, 147, 148, and 149, at least one outlet chamber may have orifices 152 for expanding the refrigerant selectively flowing from the connection flow paths.

A plurality of the orifices 152 may be formed along the interior circumference of the outer housing 100 to correspond to the first, second, and fifth outlet chambers 144, 145, and 148.

Here, the orifice 152 may be formed at predetermined positions in the section in which the first, second, and fifth outlet chambers 144, 145, and 148 are positioned in place of the connection hole 150, respectively.

These orifices 152 may expand the refrigerant inflowing from the connection flow paths to the first, second, and fifth outlet chambers 144, 145, and 148.

The orifices 152 are passages that control the flow of the refrigerant by narrowing the diameter of the passage and generate pressure changes through adiabatic expansion when the refrigerant passes.

That is, when the refrigerant inflows from the connection flow paths to the first, second, and fifth outlet chambers 144, 145, and 148, the orifice 152 expands using the pressure changes to change the phase.

Accordingly, the refrigerant is adiabatic-expanded while passing through the orifice 152, and the phase change may occur.

The definition and function of this orifice 152 is self-evident to a person of ordinary skill in the art, so further detailed description will be omitted.

In the present embodiment, the inner housing 200 may be provided rotatably inside the outer housing 100 to selectively and respectively connect the first, second, and third inlets 102, 104, and 106 and the first, second, third, fourth, fifth, and sixth outlets 112, 114, 116, 118, 122, and 124.

A plurality of the connection flow paths may be formed inside the inner housing 200. Here, a plurality of the connection flow paths may include the first, second, third, fourth, fifth, and sixth connection flow paths 211, 212, 213, 214, 215, and 216.

First, the first connection flow path 211 may selectively connect the first inlet chamber 141 and the first outlet chamber 144.
The second connection flow path 212 may selectively connect the first inlet chamber 141 and the second outlet chamber 145. The third connection flow path 213 may selectively connect the second inlet chamber 142 and the third outlet chamber 146.

One end of the fourth connection flow path 214 is connected to the third connection flow path 213. The other end of the fourth connection flow path 214 may be selectively connected to the fourth outlet chamber 147.
That is, the fourth connection flow path 214 may selectively inflow the refrigerant inflowed from the second inlet chamber 142 to the third connection flow path 213 to the fourth outlet chamber 147.

The fifth connection flow path 215 may selectively connect the third inlet chamber 143 and the fifth outlet chamber 148.

Also, one end of the sixth connection flow path 216 may be connected to the fifth connection flow path 215. The other end of the sixth connection flow path 216 may be selectively connected to the sixth outlet chamber 149.
That is, the sixth connection flow path 216 may selectively inflow the refrigerant inflowed from the third inlet chamber 143 to the fifth connection flow path 215 to the sixth outlet chamber 149.

Here, a seal member 300 for preventing the refrigerant from leaking between the outer housing 100 and the inner housing 200 may be interposed between the outer housing 100 and the inner housing 200. The seal member 300 may seal between the interior circumference of the outer housing 100 and the exterior circumference of the inner housing 200, thereby preventing the refrigerant from leaking out of the multi-way refrigerant valve 1.

Also, the cover member 400 may be mounted on the open surface of the outer housing 100. This cover member 400 may cover or close the open surface of the outer housing 100 while the inner housing 200 and the seal member 300 are mounted on the outer housing 100.

Meanwhile, in the present embodiment, the multi-way refrigerant valve 1 may further include a driving unit 500. The driving unit 500 is connected to the rotation center of the inner housing 200 and may selectively rotate the inner housing 200 inside the outer housing 100.

That is, the driving unit 500 may generate power to rotate the inner housing 200. Accordingly, the driving unit 500 may rotate the inner housing 200 at a predetermined angle inside the outer housing 100 so that the inflowed refrigerant forms a plurality of flow paths. The driving unit 500 may be mounted on the cover member 400 at the outside of the outer housing 100, and the rotation shaft of the driving unit 500 may be connected to the rotation center of the inner housing 200.

The driving unit 500 configured in this way may be implemented through a stepping motor or a solenoid to rotate the inner housing 200 at a predetermined angle according to the selected mode of the vehicle.

On the other hand, in the outer housing 100, at least one flow rate control apparatus 600 for controlling the flow rate of the refrigerant exhausted to the outside from any one of the first to sixth outlets 112, 114, 116, 118, 122, and 124 may be provided.

Referring again to FIG. 1, the flow rate control apparatus 600 may be provided in the first outlet 112, the second outlet 114, the fifth outlet 122, and the sixth outlet 124, respectively. The flow rate control apparatus 600 may include an adjusting member 610 for adjusting the diameter of the first, second, and fifth outlets 112, 114, 122, and 124 and an actuator 620 for operating the adjusting member 610. For the adjusting member 610, one type of ball, butterfly, flap, or needle type may be applied.

Here, when the adjusting member 610 is applied as a needle type, the adjusting member 610 of the needle type may control the flow rate of the refrigerant exhausted through the outlet and simultaneously may expand the refrigerant, so the orifice 152 may be omitted.

That is, the multi-way refrigerant valve 1 according to an embodiment of the present disclosure has been described as an embodiment in which both the orifices 152 and the flow rate control apparatus 600 are applied, however the present disclosure is not limited thereto, and the orifice 152 may be selectively omitted according to the application type of the adjusting member 610 in the flow rate control apparatus 600.

The multi-way refrigerant valve 1 configured in this way rotates the inner housing 200 by the operation of the driving unit 500 according to the selected mode, thereby selectively connecting the first to third inlets 102, 104, and 106 to the first to sixth outlets 112, 114, 116, 118, 122, and 124 through the first to sixth connection flow paths 211, 212, 213, 214, 215, and 216 to form the variety of refrigerant flow paths.

That is, when the inner housing 200 is rotated at a predetermined interval by the driving unit 500 operating in the selected mode of the vehicle, the first inlet 102 may be selectively connected to any one or both of the first outlet 112 or the second outlet 114 through the first connection flow path 211 and/or the second connection flow path 212.

Also, the second inlet 104 may be selectively connected to any one of the third outlet 116 or the fourth outlet 118 through the third connection flow path 213 and/or the fourth connection flow path 214.

In addition, the third inlet 106 may be selectively connected to any one or both of the fifth outlet 122 or the sixth outlet 124 through the fifth connection flow path 215 and/or the sixth connection flow path 216.

Hereinafter, the operation and action of the multi-way refrigerant valve 1 according to an embodiment of the present disclosure configured as described above are described with reference to FIG. 5 to FIG. 8.

In the present embodiment, the modes may include a first mode to a fourth mode in which the inner housing 200 is rotated at a predetermined angle by the operation of the driving unit 500 inside the outer housing 100.

That is, the multi-way refrigerant valve 1 may be operated in the first mode to the fourth mode, respectively. First, the operation for the first mode is described with reference to FIG. 5.

Figure 5:
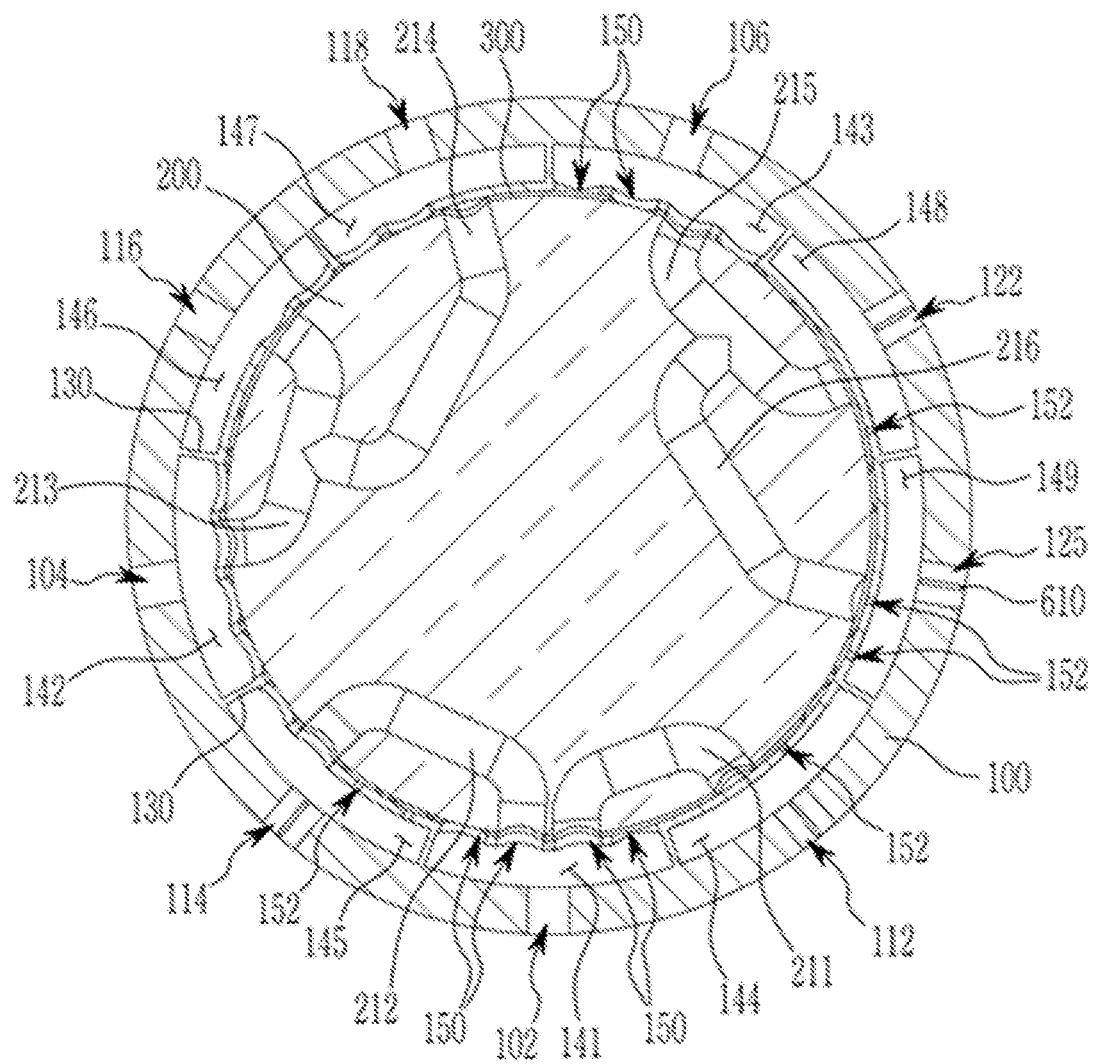
FIG. 5 is a view to explain an operation for a first mode in a multi-way refrigerant valve according to an embodiment of the present disclosure.

FIG. 5 is a view to explain an operation for a first mode in a multi-way refrigerant valve according to an embodiment of the present disclosure. Here, the first mode is a cooling mode for cooling the interior of the vehicle. Referring to FIG. 5, in the first mode, the first inlet 102 is connected to the second outlet 114 through the second connection flow path 212. The second inlet 104 is connected to the third outlet 116 through the third connection flow path 213. The third inlet 106 is connected to the sixth outlet 124 through the fifth connection flow path 215 and the sixth connection flow path 216.

Here, the first outlet 112, the fourth outlet 118, and the fifth outlet 122 may be closed. That is, one end of the first connection flow path 211 is connected to the connection hole 150 formed in the first inlet chamber 141, but the other end of the first connection flow path 211 is positioned at the closed part without the connection hole 150 in the first outlet chamber 144.

The fourth connection flow path 214 is positioned in the closed portion without the connection hole 150 in the fourth outlet chamber 146.

In addition, one end of the fifth connection flow path 215 is connected to the connection hole 150 formed in the third inlet chamber 143, but the other end of the fifth connection flow path 215 is positioned at the closed portion without the orifice 152 in the fifth outlet chamber 148.

Accordingly, the refrigerant that inflows from the multi-way refrigerant valve 1 to the first, second, and third inlets 102, 104, and 106 may not be exhausted to the first, fourth, and fifth outlets 112, 118, and 122.

That is, the refrigerant inflowed to the first inlet 102 may be exhausted through the second outlet 114 after inflowing from the first inlet chamber 141 to the second outlet chamber 145 along the first connection flow path 211.

In addition, the refrigerant inflowed into the second inlet 104 may be exhausted through the third outlet 116 after inflowing from the second inlet chamber 142 to the third outlet chamber 146 along the third connection flow path 213.

Also, the refrigerant inflowed to the third inlet 106 is inflowed from the third inlet chamber 143 to the fifth connection flow path 215 and is inflowed to the sixth outlet chamber 149 along the sixth connection flow path 216 connected to the fifth connection flow path 215.

Here, the refrigerant may be exhausted through the sixth outlet 124 after being expanded while passing through the orifice 152 formed in the sixth outlet chamber 149.

In the present embodiment, the operation for the second mode is described with reference to FIG. 6. Here, the second mode is a mode for cooling the battery module provided in the vehicle while cooling the interior of the vehicle.

This second mode is a state in which the inner housing 200 is rotated clockwise by the driving unit 500 at an angle of 10° from the position of the inner housing 200 in the first mode based on an imaginary line L1 passing through the rotation center of the inner housing 200 from the first inlet 102.

Figure 6:
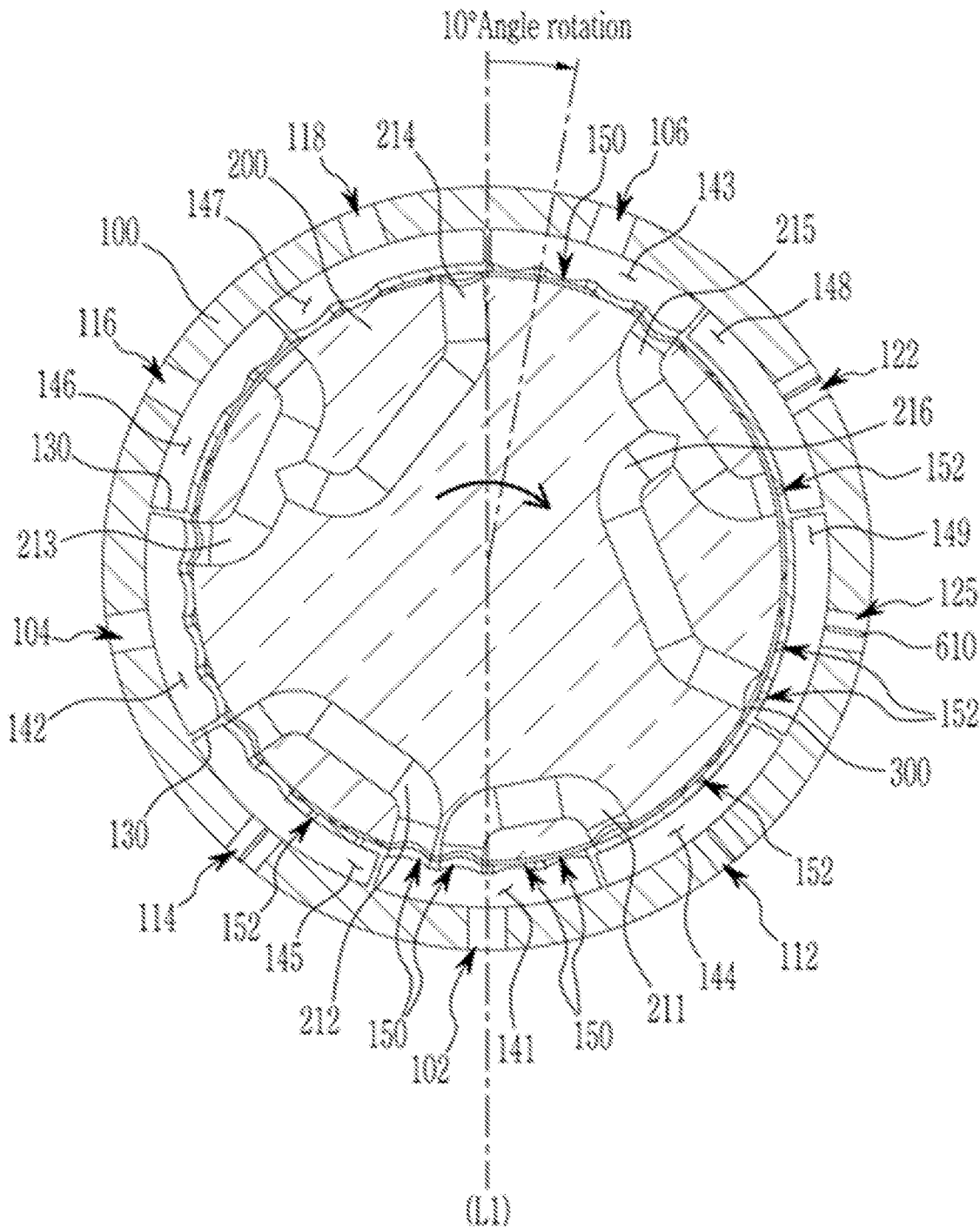
FIG. 6 is a view to explain an operation for a second mode in a multi-way refrigerant valve according to an embodiment of the present disclosure.

Referring to FIG. 6, in the second mode, the first inlet 102 is connected to the second outlet 114 through the second connection flow path 212.
The second inlet 104 is connected to the third outlet 116 through the third connection flow path 213. Also, the third inlet 106 is connected to the fifth outlet 122 and the sixth outlet 124 through the fifth connection flow path 215 and the sixth connection flow path 216, respectively.

Here, the first outlet 112 and the fourth outlet 118 may be closed.
That is, one end of the first connection flow path 211 is connected to the connection hole 150 formed in the first inlet chamber 141, but the other end of the first connection flow path 211 is positioned at the closed part without the connection hole 150 in the first outlet chamber 144.

The fourth connection flow path 214 is positioned in the closed portion without the connection hole 150 in the fourth outlet chamber 146. Accordingly, the refrigerant inflowed from the multi-way refrigerant valve 1 to the first, second, and third inlets 102, 104, and 106 may not be exhausted to the first and fourth outlets 112 and 118.

That is, the refrigerant inflowed to the first inlet 102 may be exhausted through the second outlet 114 after inflowing from the first inlet chamber 141 to the second outlet chamber 145 along the first connection flow path 211.

In addition, the refrigerant inflowed into the second inlet 104 may be exhausted through the third outlet 116 after inflowing from the second inlet chamber 142 to the third outlet chamber 146 along the third connection flow path 213.

In addition, the refrigerant inflowed into the third inlet 106 may be exhausted through the fifth outlet 122 after inflowing from the third inlet chamber 143 along the fifth connection flow path 215 into the fifth outlet chamber 148.

At the same time, some refrigerant among the refrigerant flowing along the fifth connection flow path 215 may be inflowed into the sixth outlet chamber 149 along the sixth connection flow path 216 and then exhausted through the sixth outlet 124.

Here, the refrigerant may be exhausted through the fifth outlet 122 and the sixth outlet 124, respectively, after being expanded while passing through each of the orifice 152 formed in the fifth outlet chamber 148 and the sixth outlet chamber 149.

Figure 7:
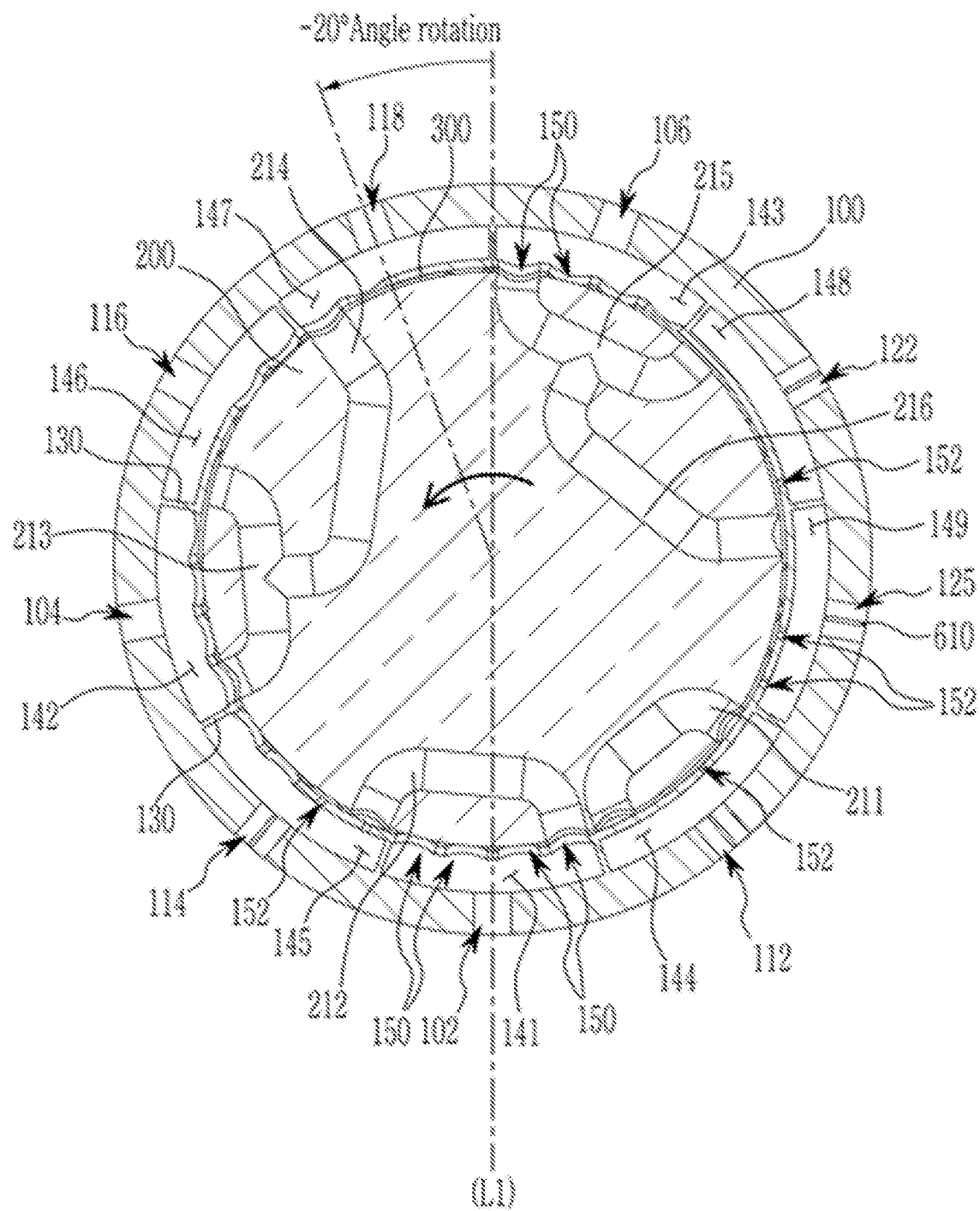
FIG. 7 is a view to explain an operation for a third mode in a multi-way refrigerant valve according to an embodiment of the present disclosure.

FIG. 7 is a view to explain an operation for a third mode in a multi-way refrigerant valve according to an embodiment of the present disclosure.
Here, the third mode is a mode for heating the interior of the vehicle.
This third mode is a state in which the inner housing 200 is rotated counterclockwise by the driving unit 500 at an angle of 20° from the position of the inner housing 200 in the first mode based on the imaginary line L1 passing through the rotation center of the inner housing 200 from the first inlet 102.

Referring to FIG. 7, in the third mode, the first inlet 102 is connected to the second outlet 114 through the second connection flow path 212.
The second inlet 104 is connected to the fourth outlet 118 through the third connection flow path 213 and the fourth connection flow path 214.

Here, the first outlet 112, the third outlet 116, the fifth outlet 122, and the sixth outlet 124 may be closed. That is, as both ends of the first connection flow path 211 are positioned in the first outlet chamber 144, the flow of the refrigerant may be prevented.

One end of the third connection flow path 213 is connected to the connection hole 150 formed in the second inlet chamber 142, but the other end of the third connection flow path 231 is positioned on the closed portion without the connection hole 150 in the third outlet chamber 144.

One end of the fifth connection flow path 215 is connected to the connection hole 150 formed in the third inlet chamber 143, but the other end of the fifth connection flow path 215 is positioned on the closed part without the orifice 152 in the fifth outlet chamber 148.

In addition, one end of the sixth connection flow path 216 is communicated with the fifth connection flow path 215, but the other end of the sixth connection flow path 216 is positioned in the closed portion without the orifice 152 in the sixth outlet chamber 149.

Accordingly, the refrigerant inflowed from the multi-way refrigerant valve 1 to the first, second, and third inlets 102, 104, and 106 may not be exhausted to the first outlet 112, the third outlet 116, the fifth outlet 122, and the sixth outlet 124.

That is, the refrigerant inflowed to the first inlet 102 may be exhausted through the second outlet 114 after inflowing from the first inlet chamber 141 to the second outlet chamber 145 along the second connection flow path 212.

Here, the refrigerant may be expanded while passing through the orifice 152 formed in the second outlet chamber 145, and then exhausted through the second outlet 114.

In addition, the refrigerant inflowed into the second inlet 104 may inflow from the second inlet chamber 142 to the fourth outlet chamber 147 along the third connection flow path 213 and the fourth connection flow path 214, and then may be exhausted through the fourth outlet 118.

Figure 8:
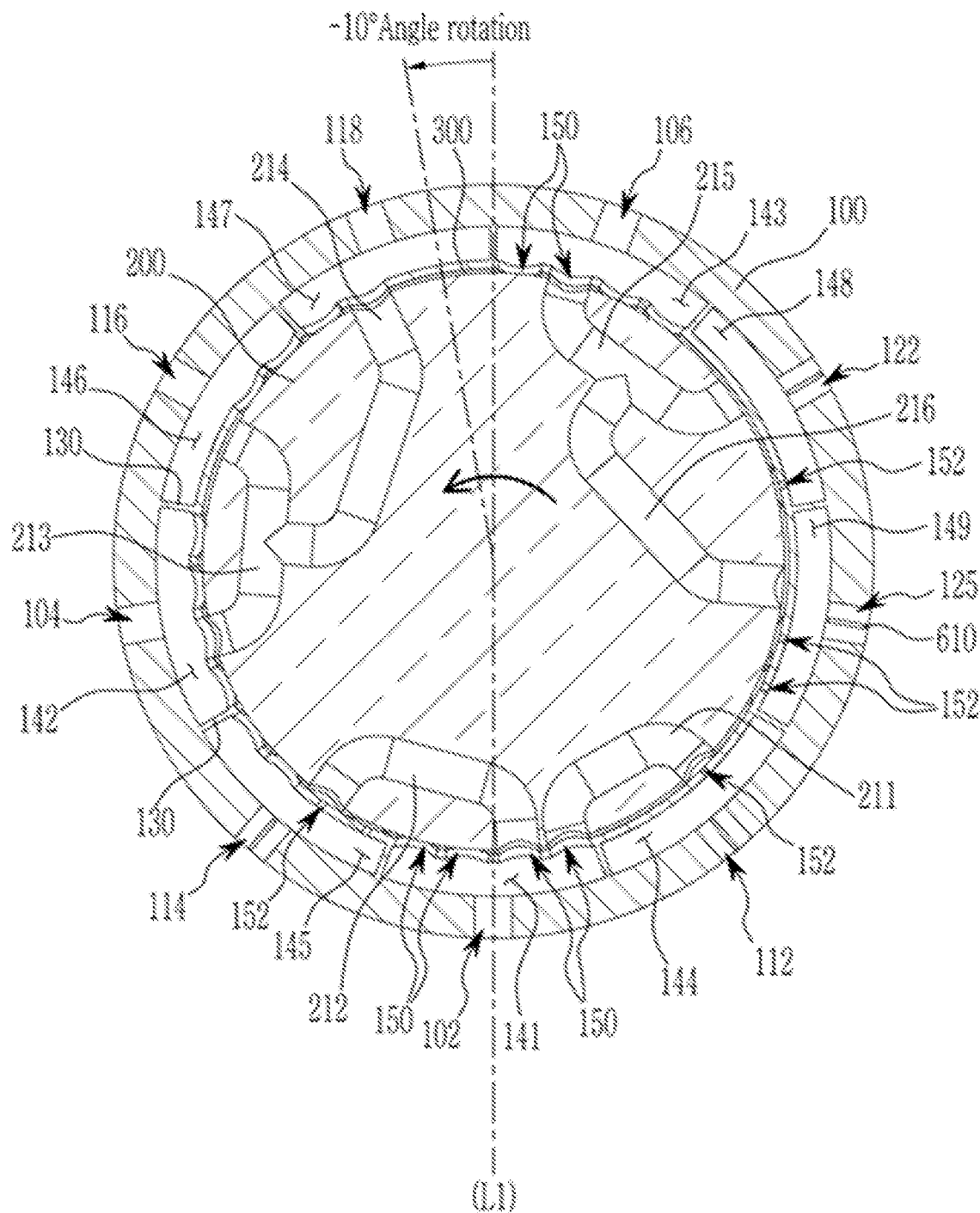
FIG. 8 is a view to explain an operation for a fourth mode in a multi-way refrigerant valve according to an embodiment of the present disclosure.

FIG. 8 is a view to explain an operation for a fourth mode in a multi-way refrigerant valve according to an embodiment of the present disclosure.

Here, the fourth mode is a mode for dehumidifying the interior of the vehicle while heating it.

The fourth mode is a state in which the inner housing 200 is rotated counterclockwise by the driving unit 500 at an angle of 10° from the position of the inner housing 200 in the first mode based on the imaginary line L1 passing through the rotation center of the inner housing 200 from the first inlet 102.

Referring to FIG. 8, in the fourth mode, the first inlet 102 is connected to the first outlet 112 through the first connection flow path 211.

In addition, the first inlet is connected to the second outlet 114 through the second connection flow path 212.

The second inlet 104 is connected to the fourth outlet 118 through the third connection flow path 213 and the fourth connection flow path 214.

Here, the third outlet 116, the fifth outlet 122, and the sixth outlet 124 may be closed. That is, one end of the third connection flow path 213 is connected to the connection hole 150 formed in the second inlet chamber 142, but the other end of the third connection flow path 231 is positioned in the closed portion without the connection hole 150 in the third outlet chamber 144.

One end of the fifth connection flow path 215 is connected to the connection hole 150 formed in the third inlet chamber 143, but the other end of the fifth connection flow path 215 is positioned in the closed portion without the orifice 152 in the fifth outlet chamber 148.

In addition, one end of the sixth connection flow path 216 is communicated with the fifth connection flow path 215, but the other end of the sixth connection flow path 216 is positioned in the closed portion without the orifice 152 in the sixth outlet chamber 149.

Accordingly, the refrigerant inflowed from the multi-way refrigerant valve 1 to the first, second, and third inlets 102, 104, and 106 may be not exhausted to the third outlet 116, the fifth outlet 122, and the sixth outlet 124.

That is, the refrigerant inflowed to the first inlet 102 may be exhausted through the second outlet 114 after inflowing from the first inlet chamber 141 to the first outlet chamber 144 along the first connection flow path 211.

At the same time, the refrigerant inflowed into the first inlet 102 may be inflowed from the first inlet chamber 141 to the second outlet chamber 145 along the second connection flow path 212 and then exhausted through the second outlet 114.

Here, the refrigerant may be expanded while passing through the orifice 152 formed in the first outlet chamber 144 and the second outlet chamber 145, respectively, and then exhausted through the first and second outlets 112 and 114.

In addition, the refrigerant inflowed into the second inlet 104 may inflow from the second inlet chamber 142 to the fourth outlet chamber 147 along the third connection flow path 213 and the fourth connection flow path 214, and then be exhausted through the fourth outlet 118.

Accordingly, the multi-way refrigerant valve 1 forms a plurality of refrigerant flow paths to which the refrigerant flows between the outer housing 100 and the inner housing 200 by the rotation of the inner housing 200 according to the mode of the vehicle through each operation of the first mode to the fourth mode, thereby minimizing the number of the expansion valves and refrigerant valves applied to the conventional heat pump system and promoting the simplification of the heat pump system.

Hereinafter, the heat pump system to which the multi-way refrigerant valve 1 configured as described above is applied is described in detail with reference to FIG. 9.

Figure 9:
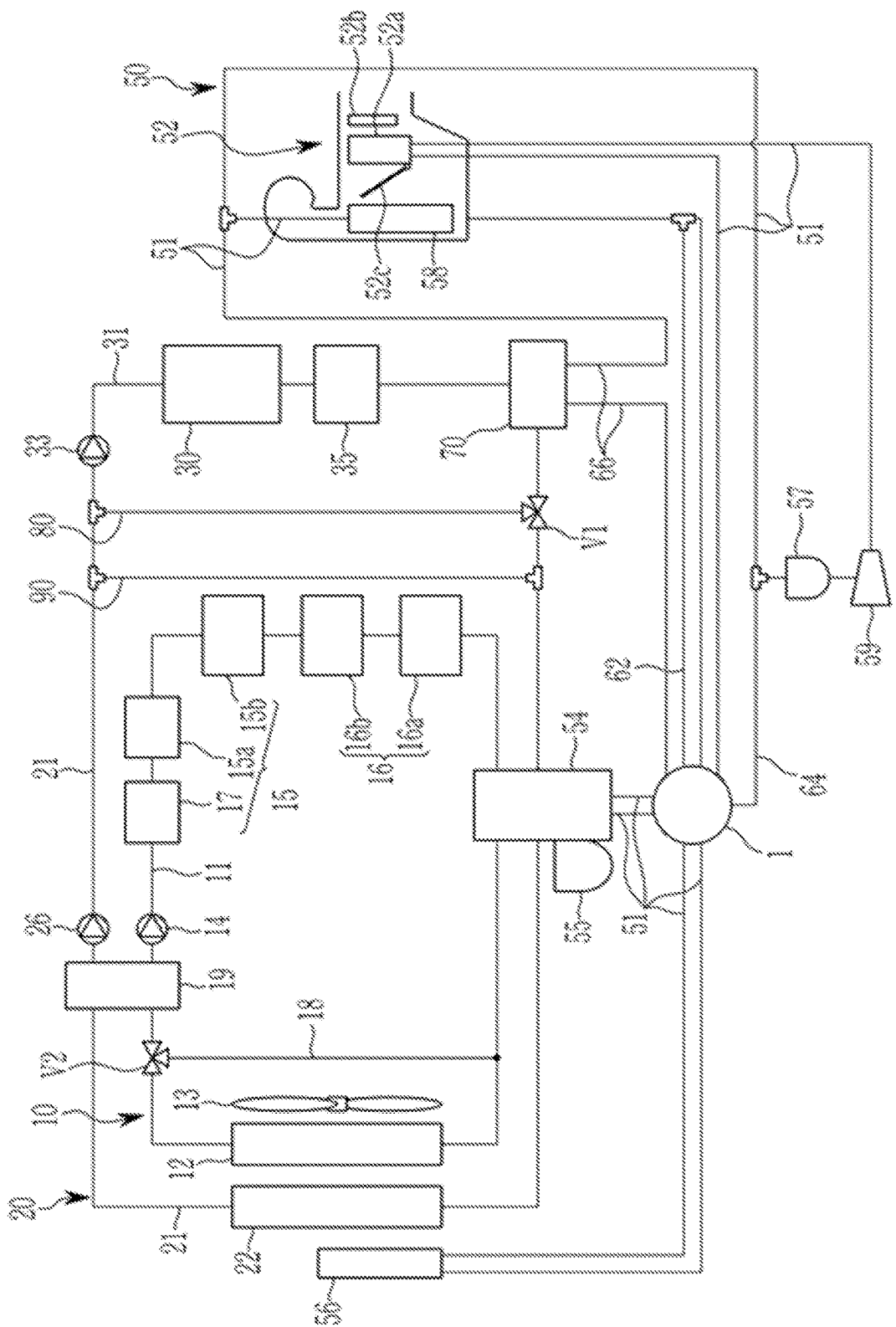
FIG. 9 is a block diagram of a heat pump system to which a multi-way refrigerant valve is applied according to an embodiment of the present disclosure.

FIG. 9 is a block diagram of a heat pump system to which a multi-way refrigerant valve is applied according to an embodiment of the present disclosure.

Referring to FIG. 9, the heat pump system may be applied to the electric vehicle, and a first cooling apparatus 10 for cooling the electrical component 15 and the motor 16, a second cooling apparatus 20 for cooling the battery module 30, and an air conditioner device 50 as an air conditioning device for cooling or heating the interior of the vehicle may be interlocked.

That is, the heat pump system includes the multi-way refrigerant valve 1 shown in FIG. 1, the first and second cooling apparatus 10 and 20, the battery module 30, and the chiller 70 as described above.

First, the first cooling apparatus 10 includes a first radiator 12 and a first water pump 14 connected to the first coolant line 11.

This first cooling apparatus 10 circulates the coolant in the first coolant line 11 through the operation of the first water pump 14 to cool at least one electrical component 15 and at least one motor 16.

The first radiator 12 is disposed at the front of the vehicle, and the cooling fan 13 is provided at the rear to cool the coolant through the operation of the cooling fan 13 and a heat-exchange with the outside air.

Here, the electrical component 15 may include an autonomous driving controller, a power control apparatus, an inverter, or a charger (17: On Board Charger, OBC). The autonomous driving controller, the power control apparatus and the inverter may be heated while driving, and the charger 17 may be heated when charging the battery module 30.

In addition, the inverter may include first and second inverters 15a and 15b provided in the first coolant line 11 by corresponding to the front wheel and rear wheel of the vehicle.

Also, the motor 16 may include first and second motors 16a and 16b provided in the first coolant line 11 by corresponding to the front wheel and rear wheel of the vehicle.

The electrical component 15 and the motor 16 configured in this way may be disposed in series in the first coolant line 11.

That is, the electrical component 15 and the motor 16 may be water-cooled by the coolant supplied to the first coolant line 11.

Accordingly, when waste heat of the electrical component 15 and the motor 16 is recovered in the heating mode of the vehicle, heat generated from the power control apparatus, the inverter, the charger 17, the autonomous driving controller, and the motor 16 may be recovered.

Meanwhile, a reservoir tank 19 is provided in the first coolant line 11 between the first radiator 12 and the first water pump 14. In the reservoir tank 19, the coolant cooled by the first radiator 12 and a second radiator 22 to be described later may be stored.

The first cooling apparatus 10 configured in this way circulates the coolant cooled from the first radiator 12 through the operation of the first water pump 14 along the first coolant line 11 to prevent the electrical component 15 and the motor 16 from overheating.

In the present embodiment, the second cooling apparatus 20 includes a second radiator 22 and a second water pump 26 connected to the second coolant line 21, and circulates the coolant to the second coolant line 21.

This second cooling apparatus 20 may selectively supply the coolant cooled in the second radiator 22 to the battery module 30.

The second radiator 22 is disposed in front of the first radiator 12 and cools the coolant through the operation of the cooling fan 13 and the heat-exchange with the outside air.

In addition, the reservoir tank 19 may be provided in the second coolant line 21 between the second radiator 22 and the second water pump 26. That is, the coolant cooled by the first and second radiators 12 and 22 may be stored in the reservoir tank 19.

The second cooling apparatus 20 configured in this way may circulate the coolant cooled in the second radiator 22 along the second coolant line 21 through the operation of the second water pump 26.

On the other hand, in the present embodiment, the second cooling apparatus 20 is provided with the second radiator 22 as an embodiment, but it is not limited thereto, and the second cooling apparatus 20 may be connected to the first radiator 12 instead of the second radiator 22.

That is, if there is no second radiator 22 in the second cooling apparatus 20, the second coolant line 21 may be connected to the first radiator 12 so that the coolant is supplied from the first radiator 12.

In the present embodiment, the battery module 30 is provided in the battery coolant line 31 that is selectively connected to the second coolant line 21 and through the first valve V1.

Here, the first valve V1 may selectively connect the second coolant line 21 and the battery coolant line 31 between the second radiator 22 and the battery module 30.

In more detail, the first valve V1 selectively connects the second coolant line 21 and the battery coolant line 31 between the chiller 70 provided in the battery coolant line 31 and the second radiator 22.

Here, the battery module 30 supplies the power to the electrical component 15 and the motor 16, and is formed in a water cooling type that is cooled with the coolant flowing along the battery coolant line 31.

That is, the battery module 30 is selectively connected to the second cooling apparatus 20 through the battery coolant line 31 according to the operation of the first valve V1. In addition, in the battery module 30, the coolant may be circulated inside through the operation of the third water pump 33 provided in the battery coolant line 31.

The third water pump 33 operates to circulate the coolant through the battery coolant line 31.

Here, the first, second, and third water pumps 14, 26, and 33 may be electric water pumps.

On the other hand, in the first cooling apparatus 10, a first branched line 18 connected to the first coolant line 11 between the first radiator 12 and the first water pump 14 through the second valve V2 provided on the first coolant line 11 may be provided between the first radiator 12 and the first water pump 14.

More specifically, the second valve V2 is provided in the first coolant line 11 between the first radiator 12 and the reservoir tank 19.

One end of the first branched line 18 is connected to the first coolant line 11 through the second valve V2. The other end of the first branched line 18 may be connected to the first coolant line 11 between the electrical component 15 and the first radiator 12.

The first branched line 18 is selectively opened through the operation of the second valve V2 when the temperature of the coolant is increased by absorbing the waste heat generated by the electrical component 15 and the motor 16.

At this time, the first coolant line 11 connected to the first radiator 12 is closed through the operation of the second valve V2.

In the present embodiment, the chiller 70 is provided in the battery coolant line 31, the coolant passes therein, and it is connected to refrigerant line 51 of the air conditioner device 50 through the refrigerant connection line 66.

The chiller 70 may control the temperature of the coolant by heat-exchanging the coolant selectively inflowed inside with the refrigerant supplied from the air conditioner device 50. Here, the chiller 70 may be a water-cooled heat exchanger in which the coolant is inflowed.

Meanwhile, a coolant heater 35 may be provided in the battery coolant line 31 between the battery module 30 and the chiller 70.

The coolant heater 35 is operated ON to heat the coolant circulated in the battery coolant line 31 when the temperature of the battery module 30 is required to be increased, and the coolant whose temperature has risen may be inflowed into the battery module 30.

The coolant heater 35 may be an electric heater that operates depending on a power supply.

In addition, the battery coolant line 31 may include a second branched line 80 that connects each battery coolant line 31 between the chiller 70 and the battery module 30 through the first valve V1.

That is, the second branched line 80 may selectively separate the second coolant line 21 and the battery coolant line 31 according to the operation of the first valve V1 so that the battery coolant line 31 forms a close and seal circuit independent of the second cooling apparatus 20.

Also, the second coolant line 21 is equipped with a third branched line 90 that separates the battery coolant line 31 and the second coolant line 21.

The third branched line 90 may be selectively connected to the second coolant line 21 so that the second cooling apparatus 20 forms an independent close and seal circuit through the second coolant line 21.

Meanwhile, a separate valve may be provided at a point where the third branched line 90 intersects with the second coolant line 21 and the battery coolant line 31, or on the third branched line 90. These valves may be 3-Way or 2-Way valves.

Accordingly, the first valve V1 selectively connects the second coolant line 21 and the battery coolant line 31 or selectively connects the battery coolant line 31 and the second branched line 80 to control the flow of the coolant.

That is, when cooling the battery module 30 by using the coolant cooled in the second radiator 22, the first valve V1 may connect the second coolant line 21 connected to the second radiator 22 and the battery coolant line 31 and close the second branched line 80.

Thus, the coolant cooled in the second radiator 22 may cool the battery module 30 while being flowed along the second coolant line 21 and the battery cooling line 31 connected through the operation of the first valve V1.

In addition, when cooling the battery module 30 by using the coolant heat-exchanged with the refrigerant, the first valve V1 opens the second branched line 80 and closes the connection of the second coolant line 21 and the battery coolant line 31.

Accordingly, the coolant of a low temperature, which has completed heat-exchange with the refrigerant in the chiller 70, flows into the battery module 30 through the second branched line 80 opened by the first valve V1, thereby efficiently cooling the battery module 30.

On the other hand, when the battery module 30 is heated, by preventing the coolant circulating along the battery coolant line 31 from flowing into the second radiator 22 through the operation of the first valve V1, the temperature of the battery module 30 may be quickly raised by inflowing the coolant heated through the operation of the coolant heater 35 to the battery module 30.

On the other hand, in the present embodiment, the valve is not configured in the third branched line 90 as an embodiment, but it is not limited thereto, and an application of the valve is possible as needed for the selective opening of the third branched line 90.

That is, it is possible to control the flow rate of the circulating coolant through the second coolant line 21, the battery coolant line 31, and the second branched line 80, which are selectively connected, and the operations of the second and third water pumps 26 and 33. By doing so, it is possible to control the opening and closing of the third branched line 90.

On the other hand, in the present embodiment, the air conditioner device 50 includes the multi-way refrigerant valve 1, an HVAC module (Heating, Ventilation, and Air Conditioning: 52), a heat exchanger 54, a receiver dryer 55, an evaporator 58, and a compressor 59, which are connected through the refrigerant line 51.

First, the HVAC module 52 is connected through the refrigerant line 51 and is provided with an opening/closing door 52*c* inside so that the outside air that has passed through the evaporator 58 selectively inflows to the internal condenser 52*a* and the internal heater 52*b* according to the mode selected for the temperature adjustment of the interior of the vehicle.

That is, when the interior of the vehicle is heated, the opening/closing door 52*c* is opened so that the outside air passing through the evaporator 58 inflows to the internal condenser 52*a* and the internal heater 52*b*.

Conversely, when cooling the vehicle's interior, the opening/closing door 52*c* closes the internal condenser 52*a* and the internal heater 52*b* side so that the outside air cooled while passing through the evaporator 58 flows directly into the vehicle.

The heat exchanger 54 is connected to the multi-way refrigerant valve 1 through the refrigerant line 51 so that the refrigerant passes, and is respectively connected to the first and second coolant lines 11 and 21 so that the coolant circulating in the first and second cooling apparatus 10 and 20 passes.

This heat exchanger 54 may condense or evaporate the refrigerant through the heat-exchange with the coolant supplied through the first and second coolant lines 11 and 21 according to the selected mode of the vehicle.

Here, the heat exchanger 54, when the multi-way refrigerant valve 1 expands and supplies the refrigerant, may evaporate the refrigerant through the heat-exchange with the coolant, and when the multi-way refrigerant valve 1 does not expand the refrigerant, may condense the refrigerant through the heat-exchange with the coolant.

That is, the refrigerant passing through the heat exchanger 54 may be expanded or evaporated selectively according to the selected mode of the vehicle through the mutual heat-exchange with the coolant supplied from any one of the first coolant line 11 and the second coolant line 21, or the coolant supplied through each of the first and second coolant lines 11 and 21.

The heat exchanger 54 may be a water-cooled heat exchanger in which coolant is inflowed.

In the heat exchanger 54 configured in this way, each coolant with the different temperatures circulating in the first cooling apparatus 10 and the second cooling apparatus 20 flows, and at this time, the refrigerant inflowed to the coolant may be heat-exchanged with each coolant having the different temperatures.

In the present embodiment, the receiver dryer 55 may selectively exhaust the gas refrigerant and the liquid refrigerant among the refrigerants of which the heat-exchange is completed in the heat exchanger 54. The receiver dryer 55 may be integrally mounted to the heat exchanger 54.

On the other hand, the air conditioner device 50 may further include a sub-condenser 56 connected to the multi-way refrigerant valve 1 through the refrigerant line 51.

The sub-condenser 56 may be applied to further condense the refrigerant that has passed through the heat exchanger 54. This sub-condenser 56 is disposed in front of the second radiator 22 to mutually heat-exchange the refrigerant inflowed inside with the outside air.

As such, when the heat exchanger 54 condenses the refrigerant, the sub-condenser 56 further condenses the refrigerant condensed in the heat exchanger 54, thereby increasing a sub-cooling of the refrigerant, thereby a coefficient of performance (COP), which is a coefficient of a cooling capacity compared to a required compressor power, may be improved.

On the other hand, the multi-way refrigerant valve 1 may selectively expand the refrigerant supplied from the internal condenser 52*a* or the refrigerant supplied from the sub-condenser 56 according to the selected mode of the vehicle to be supplied to the heat exchanger 54, the evaporator 58, or the chiller 70.

The compressor 59 is connected between the evaporator 58 and the internal condenser 52*a* through the refrigerant line 51. This compressor 59 compresses the refrigerant in the gas state and may supply the compressed refrigerant to the internal condenser 52a.

The air conditioner device 50 configured in this way may further include the dehumidifying line 62 and the bypass line 64.

First, the dehumidifying line 62 may connect the refrigerant line 51 connecting the multi-way refrigerant valve 1 and the evaporator 58, and the multi-way refrigerant valve 1, so that the refrigerant passing through the internal condenser 52a selectively inflows from the multi-way refrigerant valve 1 to the evaporator 58.

This dehumidifying line 62 may be selectively opened by the control of the multi-way refrigerant valve 1 when indoor dehumidifying of the vehicle is required.

Also, the bypass line 64 may selectively connect the multi-way refrigerant valve 1 and the compressor 59.

That is, when the bypass line 64 is opened by the operation of the multi-way refrigerant valve 1, the refrigerant inflowed from the heat exchanger 54 to the multi-way refrigerant valve 1 may be selectively inflowed into the compressor 59 along the bypass line 64.

Here, the bypass line 64 may supply the refrigerant to the accumulator 57.

The accumulator 57 may be disposed on the refrigerant line 51 between the compressor 59 and the evaporator 58. This accumulator 57 selectively receives the refrigerant through the operation of the multi-way refrigerant valve 1 and supplies only the refrigerant in a gas state to the compressor 59, thereby improving the efficiency and durability of the compressor 59.

In the heat pump system configured in this way, the inner housing 200 provided in the multi-way refrigerant valve 1 may be operated in the first mode to the fourth mode that are rotated at a predetermined angle by the driving unit 500 inside the outer housing 100.

That is, the multi-way refrigerant valve 1 may be operated in any one selected mode among the first mode to the fourth mode.

First, the first mode may cool the interior of the vehicle. The second mode may cool the battery module 30 in the vehicle's cooling mode.

The third mode may heat the interior of the vehicle. Also, the fourth mode may dehumidify the interior of the vehicle in the vehicle's heating mode.

On the other hand, in explaining the operation of the multi-way refrigerant valve 1 according to the first mode to the fourth mode in the heat pump system, the detailed description of the coolant flow in the first and second cooling apparatus 10 and 20 is omitted.

Hereinafter, the operation and action of the heat pump system configured as above is described in detail with reference to FIG. 10 to FIG. 13.

Figure 10:
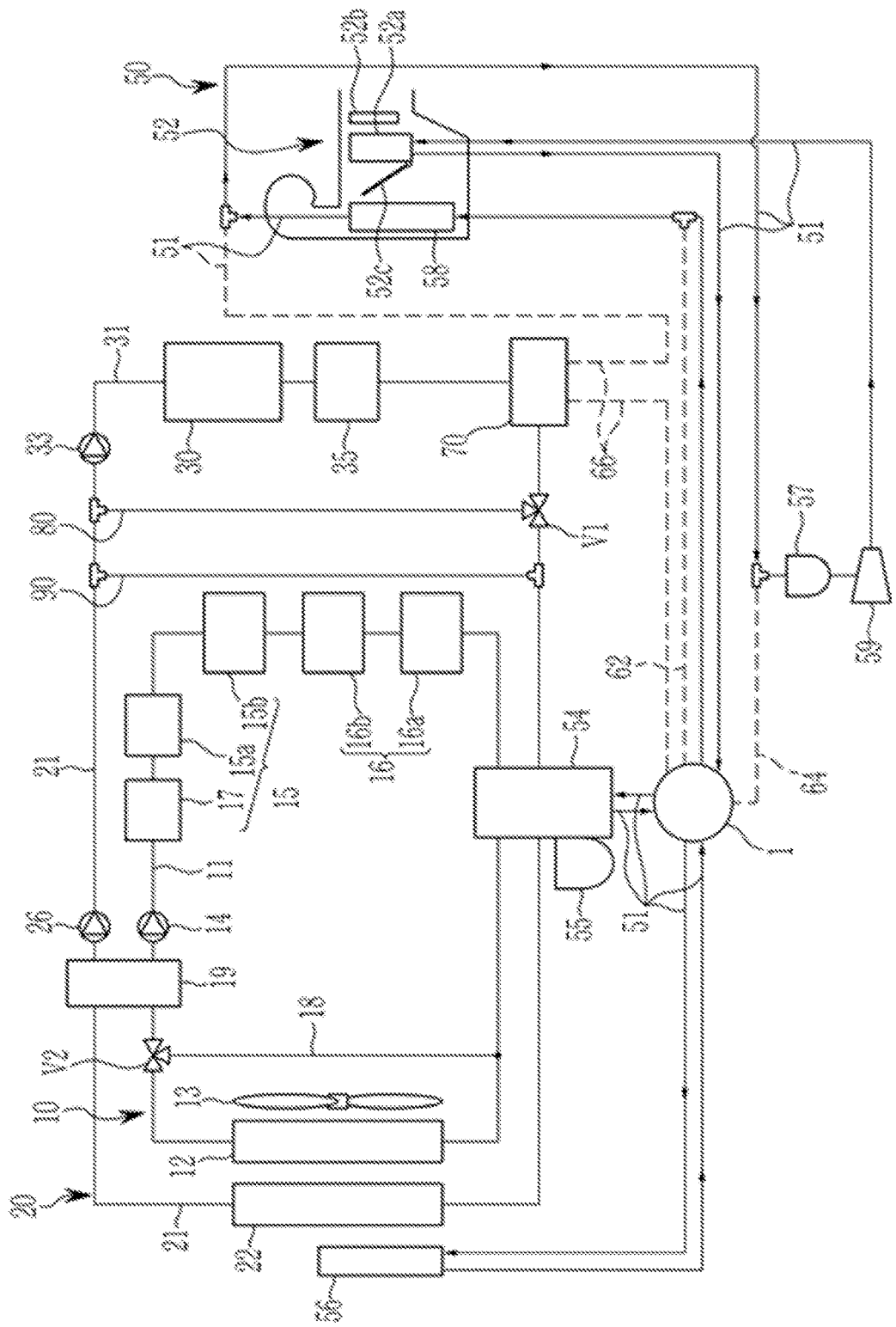
FIG. 10 is a view to explain an operation for a first mode in a heat pump system according to an embodiment of the present disclosure.

FIG. 10 is a view to explain an operation for a first mode in a heat pump system according to an embodiment of the present disclosure.

The first mode may be operated to cool the interior of the vehicle.

Referring to FIG. 10, in the first mode, the multi-way refrigerant valve 1 may close the dehumidifying line 62, the bypass line 64, and the refrigerant connection line 66.

Simultaneously, the multi-way refrigerant valve 1 may open the refrigerant line 51 so that the refrigerant supplied from the compressor 59 to the internal condenser 52a passes through the heat exchanger 54, the sub-condenser 56, and the evaporator 58 and then again inflows to the compressor 59.

That is, in the first mode, the refrigerant passing through the internal condenser 52a inflows to the first inlet 102 of the multi-way refrigerant valve 1 along the refrigerant line 51 (referring to FIG. 5).

The refrigerant that inflows to the first inlet 102 is exhausted to the second outlet 114 through the second connection flow path 212. The refrigerant exhausted to the second outlet 114 is supplied to the heat exchanger 54 along the refrigerant line 51 connected to the heat exchanger 54.

At this time, the heat exchanger 54 may condense the refrigerant through the heat-exchange with the coolant supplied from the first cooling apparatus 10 or the second cooling apparatus 20.

The refrigerant condensed in the heat exchanger 54 inflows into the second inlet 104, and exhausts through the third connection flow path 213 to the third outlet 116. The refrigerant exhausted to the third outlet 116 passes through the sub-condenser 56 along the refrigerant line 51 connected to the sub-condenser 56.

Then, the refrigerant that has passed through the sub-condenser 56 is inflowed to the multi-way refrigerant valve 1 through the third inlet 106 connected to the refrigerant line 51.

The refrigerant inflowed into the third inlet 106 is exhausted to the sixth outlet chamber 149 through the fifth connection flow path 215 and the sixth connection flow path 216. At this time, the refrigerant may be expanded by passing through the orifice 152.

The expanded refrigerant may be exhausted through the sixth outlet 124 and be supplied to the compressor 59 through the accumulator 57 after passing through the evaporator 58 along the refrigerant line 51 connected to the evaporator 58.

Here, the opening/closing door 52c may close the internal condenser 52a and the internal heater 52b side so that the external air cooled while passing through the evaporator 58 flows directly into the vehicle.

Thus, the cooled outside air may be directly directed into the interior of the vehicle, thereby cooling the interior of the vehicle.

That is, in the first mode, it is possible to cool the interior of the vehicle while repeating the operation as described above.

Figure 11:
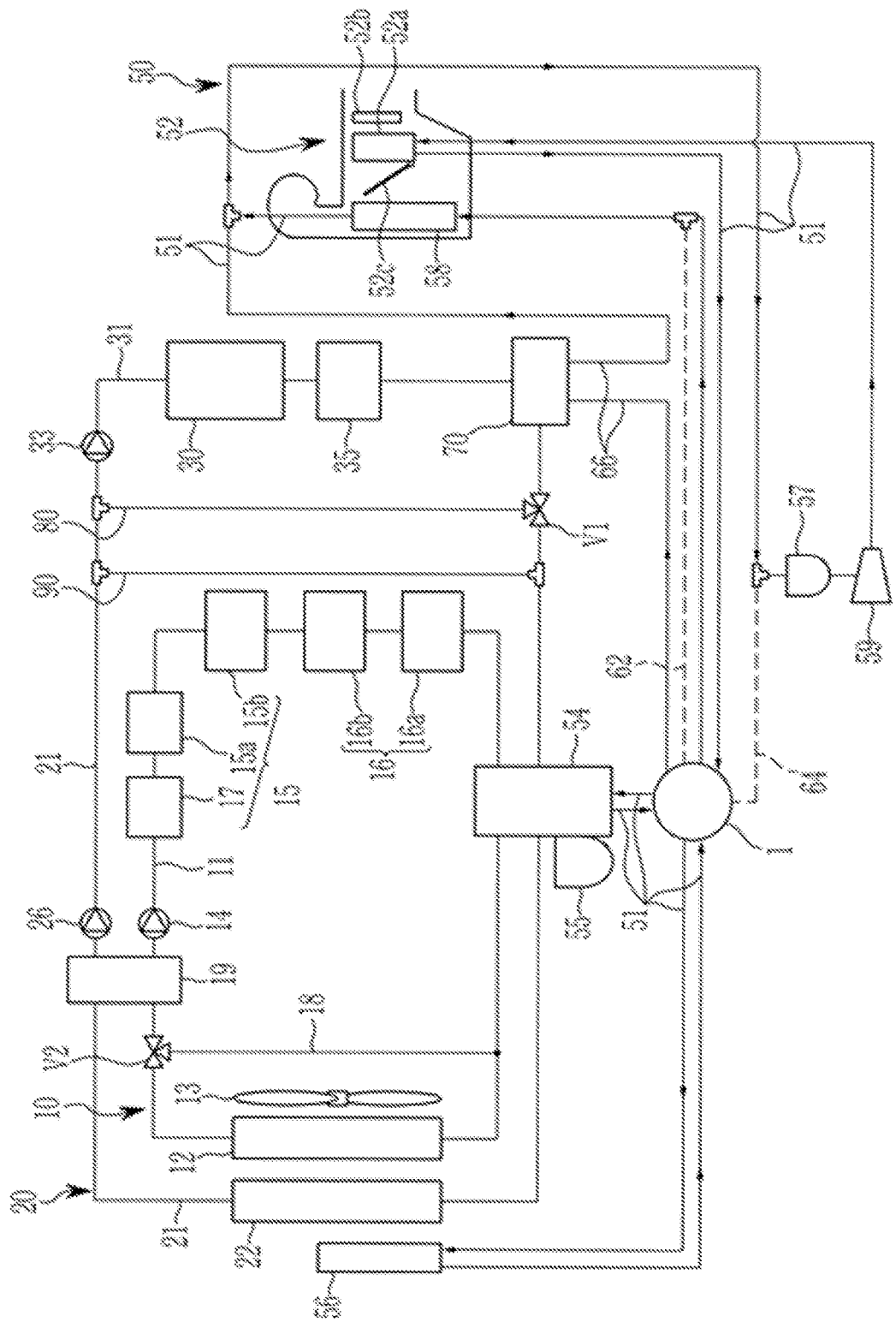
FIG. 11 is a view to explain an operation for a second mode in a heat pump system according to an embodiment of the present disclosure.

FIG. 11 is a view to explain an operation for a second mode in a heat pump system according to an embodiment of the present disclosure.

The second mode may cool the battery module 30 in the vehicle's cooling mode. Referring to FIG. 11, in the second mode, the multi-way refrigerant valve 1 may open the refrigerant connection line 66 and close the dehumidifying line 62 and the bypass line 64.

Simultaneously, the multi-way refrigerant valve 1 may open the refrigerant line 51 so that the refrigerant supplied from the compressor 59 to the internal condenser 52a passes through the heat exchanger 54, the sub-condenser 56, and the evaporator 58 and again inflows to the compressor 59.

That is, in the second mode, the refrigerant that has passed through the internal condenser 52a flows along the refrigerant line 51 to the first inlet 102 of the multi-way refrigerant valve 1 (referring to FIG. 6).

The refrigerant that inflows to the first inlet 102 is exhausted through the second connection flow path 212 to the second outlet 114. The refrigerant exhausted to the second outlet 114 is supplied to the heat exchanger 54 along the refrigerant line 51 connected to the heat exchanger 54.

At this time, the heat exchanger 54 may condense the refrigerant through the heat-exchange with the coolant supplied from the first cooling apparatus 10, or the second cooling apparatus 20.

The refrigerant condensed in the heat exchanger 54 inflows into the second inlet 104 and is exhausted through the third connection flow path 213 to the third outlet 116. The refrigerant exhausted to the third outlet 116 passes through the sub-condenser 56 along the refrigerant line 51 connected to the sub-condenser 56.

Then, the refrigerant that has passed through the sub-condenser 56 is inflowed to the multi-way refrigerant valve 1 through the third inlet 106 connected to the refrigerant line 51.

The refrigerant inflowed into the third inlet 106 is exhausted to the fifth outlet chamber 148 and the sixth outlet chamber 149 through the fifth connection flow path 215 and the sixth connection flow path 216, respectively. At this time, the refrigerant may be expanded while passing through the orifice 152 formed in the fifth and sixth outlet chambers 148 and 149, respectively.

The refrigerant exhausted to the fifth outlet 122 passes through the chiller 70 along the refrigerant connection line 66.

Here, the chiller 70 may control the temperature of the coolant by heat-exchanging the coolant that has flowed through the battery coolant line 31 with the refrigerant.

Accordingly, the coolant of a low-temperature, which has completely heat-exchanged with the refrigerant in the chiller 70, inflows into the battery module 30 along the battery coolant line 31, thereby efficiently cooling the battery module 30.

Also, the refrigerant exhausted to the sixth outlet 124 may be supplied to the compressor 59 through the accumulator 57 after passing through the evaporator 58 along the refrigerant line 51 connected to the evaporator 58.

Meanwhile, the refrigerant that has passed through the chiller 70 may be supplied to the compressor 59 through the accumulator 57 together with the refrigerant that has passed through the evaporator 58.

Here, the opening/closing door 52c may close the internal condenser 52a and the internal heater 52b side so that the external air cooled while passing through the evaporator 58 flows directly into the vehicle.
Therefore, the cooled outside air is directly inflowed into the interior of the vehicle, thereby cooling the vehicle interior.

That is, in the second mode, it is possible to cool the vehicle interior and simultaneously efficiently cool the battery module 30 while repeatedly performing the operation as described above.

Figure 12:
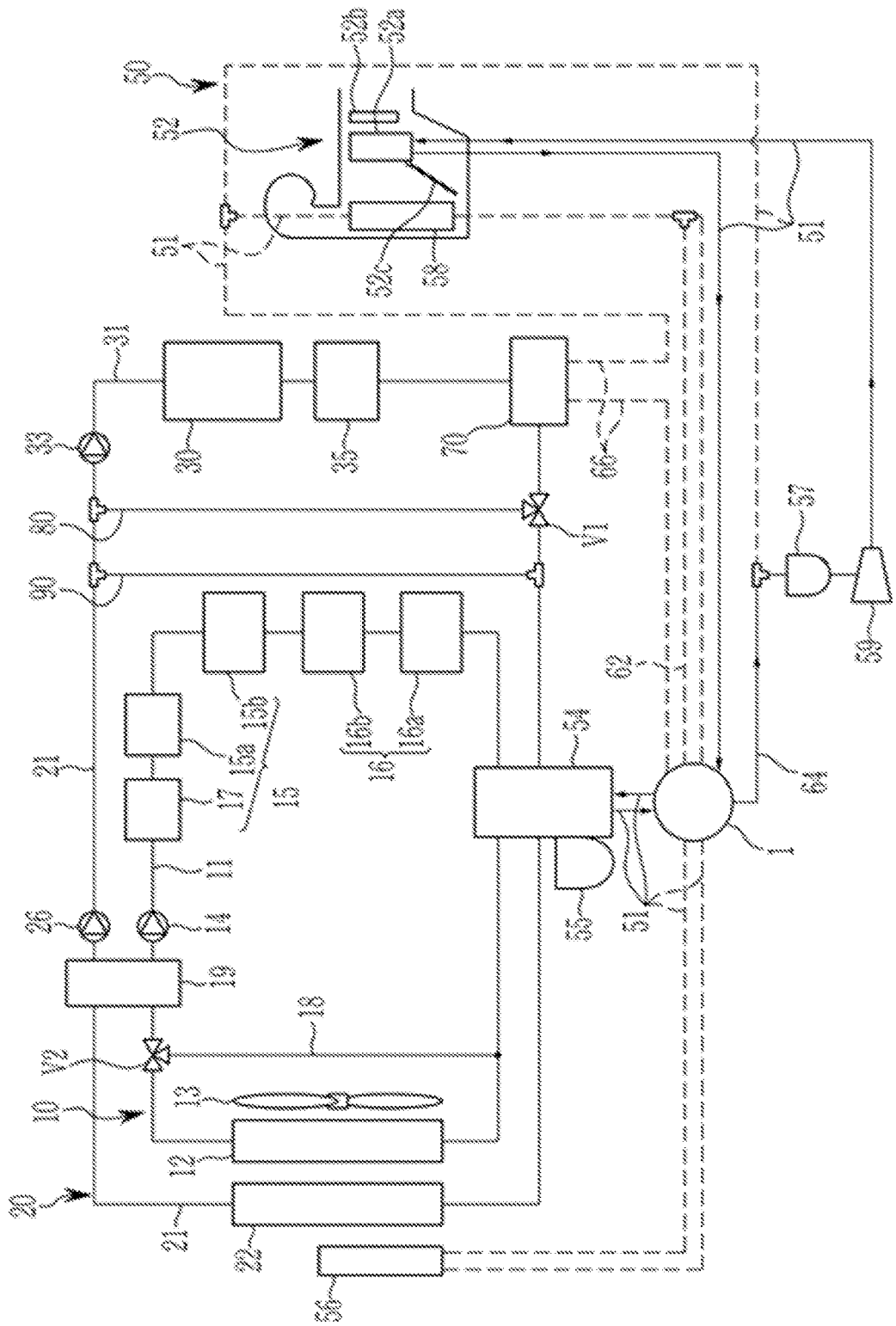
FIG. 12 is a view to explain an operation for a second mode in a heat pump system according to an embodiment of the present disclosure.

FIG. 12 is a view to explain an operation for a second mode in a heat pump system according to an embodiment of the present disclosure.

The third mode may be operated to heat the interior of the vehicle. Referring to FIG. 12, in the third mode, the multi-way refrigerant valve 1 may open the bypass line 64 and close the dehumidifying line 62 and the refrigerant connection line 66.

Simultaneously, the multi-way refrigerant valve 1 may open the remaining refrigerant line 51 except for the refrigerant line 51 respectively connected to the evaporator 58 and the sub-condenser 56 so that the refrigerant supplied from the compressor 59 to the internal condenser 52a again inflows to the compressor 59 through the heat exchanger 54.

That is, in the third mode, the refrigerant that has passed through the internal condenser 52a flows along the refrigerant line 51 to the first inlet 102 of the multi-way refrigerant valve 1 (referring to FIG. 7).

The refrigerant that inflows into the first inlet 102 is exhausted into the second outlet chamber 145 through the second connection flow path 212. At this time, the refrigerant may be expanded while passing through the orifice 152.

The expanded refrigerant is exhausted through the second outlet 114 and is supplied to the heat exchanger 54 along the refrigerant line 51 connected to the heat exchanger 54.

That is, the multi-way refrigerant valve 1 may expand the refrigerant exhausted to the refrigerant line 51 connected to the heat exchanger 54 and inflow it to the heat exchanger 54.

At this time, the heat exchanger 54 may evaporate the refrigerant through the heat-exchange with the coolant supplied from the first cooling apparatus 10 or the second cooling apparatus 20.

Here, the coolant circulating in the first cooling apparatus 10 or the second cooling apparatus 20 increases the temperature while cooling the electrical component 15, the motor 16, or the battery module 30. The coolant with the increased temperature is inflowed into the heat exchanger 54.

In this case, the heat exchanger 54 may recover the waste heat from the coolant through the heat-exchange of the supplied refrigerant and each coolant to be used for interior heating of the vehicle.

The refrigerant evaporated from the heat exchanger 54 inflows to the second inlet 104 and is exhausted to the fourth outlet 118 through the third connection flow path 213 and the fourth connection flow path 214. The refrigerant exhausted through the fourth outlet 118 passes through the accumulator 57 along the bypass line 64 connected to the accumulator 57. Then, the refrigerant may be supplied from the accumulator 57 to the compressor 59.

Here, the opening/closing door 52c is opened so that the outside air that inflows to the HVAC module 52 and passes through the evaporator 58 passes through the internal condenser 52a.

Accordingly, when the outdoor air inflowed from the outside passes through the evaporator 58 to which the refrigerant is not supplied, it is inflowed to the uncooled room temperature state. The inflowed outdoor air is converted to a high temperature state while passing through the internal condenser 52a and inflows into the vehicle interior, so that the vehicle interior may be heated.

Here, the internal heater 52b may be selectively operated according to the temperature of the outdoor air that has passed through the internal condenser 52a.

That is, the internal heater 52b may be operated when the temperature of the outdoor air that has passed through the internal condenser 52a is lower than the target temperature to heat the outdoor air that is inflowed into the interior of the vehicle.

The internal heater 52b is operated when the temperature of the outdoor air of which the heat-exchange with the refrigerant of a high temperature is completed while passing through the internal condenser 52a is lower than a predetermined temperature, or a heating target temperature.

When the internal heater 52b is operated, the outdoor air may be heated while passing through the internal heater 52b and inflow into the vehicle interior while the temperature is increased.

That is, the heat pump system according to the present embodiment is used in increasing the temperature of the refrigerant by using the waste heat of the electrical component 15, the motor 16, and the battery module 30 in the heat exchanger 54 when the indoor heating of the vehicle is required, thereby reducing the power consumption of the compressor 59 and improving the heating efficiency.

That is, in the third mode, the interior of the vehicle may be heated while repeating the operation as described above.

Figure 13:
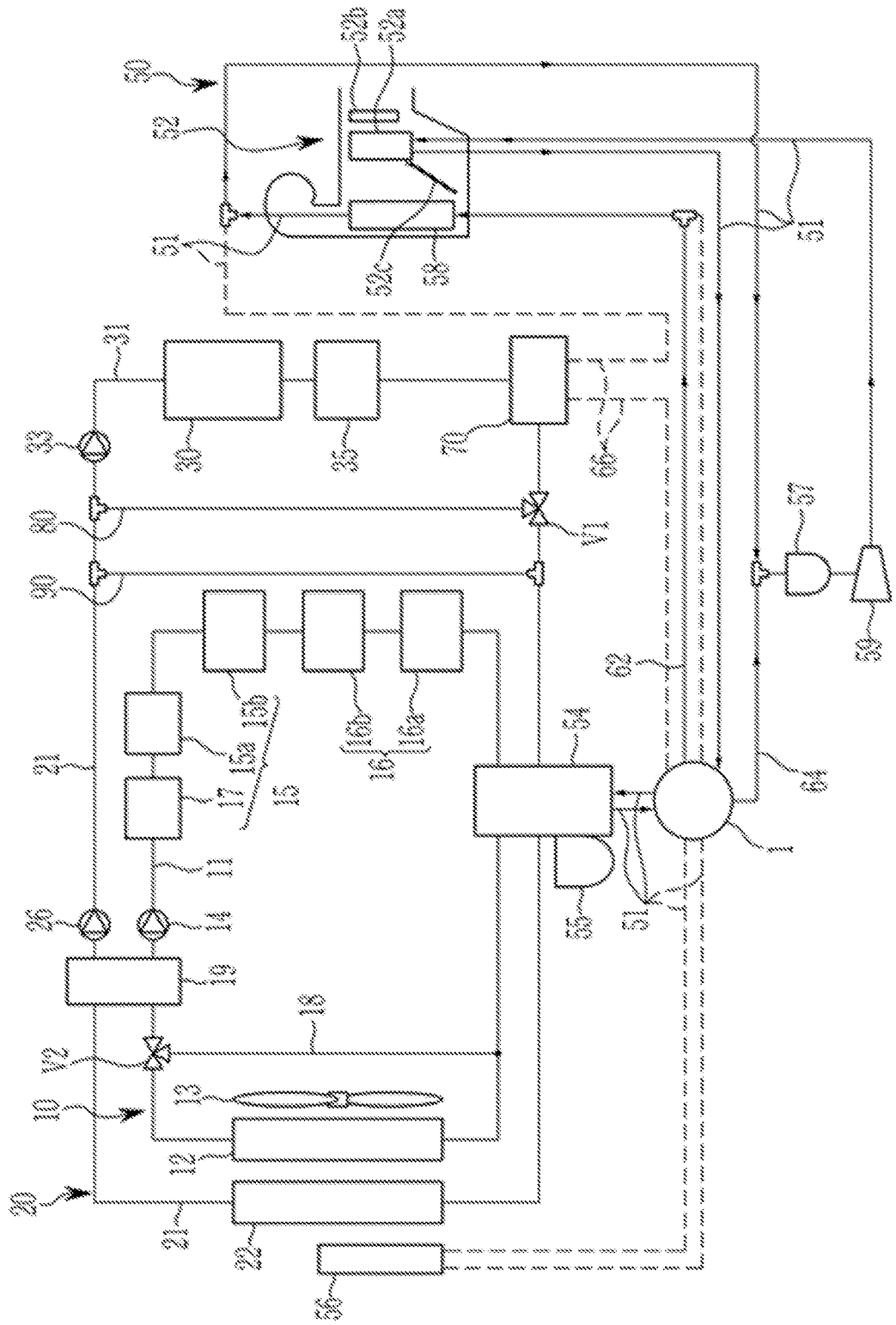
FIG. 13 is a view to explain an operation for a fourth mode in a heat pump system according to an embodiment of the present disclosure.

FIG. 13 is a view to explain an operation for a fourth mode in a heat pump system according to an embodiment of the present disclosure.

The fourth mode may dehumidify the interior of the vehicle in the heating mode of the vehicle. Referring to FIG. 13, in the fourth mode, the multi-way refrigerant valve 1 may close the refrigerant connection line 66 and open the bypass line 64 and the dehumidifying line 62.

At the same time, the multi-way refrigerant valve 1 may open the refrigerant line 51 except for the refrigerant line 51 connected to the evaporator 58 and the sub-condenser 56, respectively, so that the refrigerant supplied from the compressor 59 to the internal condenser 52*a* passes through the heat exchanger 54 and again inflows to the compressor 59.

Here, the multi-way refrigerant valve 1 may expand the refrigerant exhausted to the dehumidifying line 62 so that the refrigerant expanded through the opened dehumidifying line 62 and the refrigerant line 51 connected to the dehumidifying line 62 is supplied to the evaporator 58.

That is, in the fourth mode, the refrigerant that has passed through the internal condenser 52*a* inflows along the refrigerant line 51 to the first inlet 102 of the multi-way refrigerant valve 1 (referring to FIG. 8).

The refrigerant inflowed into the first inlet 102 is exhausted to the first outlet chamber 144 through the first connection flow path 211 and exhausted to the second outlet chamber 145 through the second connection flow path 212.

At this time, the refrigerant may be expanded while passing through the orifice 152 formed in the first and second outlet chambers 144 and 145, respectively.

First, the refrigerant expanded in the second outlet chamber 145 is exhausted through the second outlet 114, and is supplied to the heat exchanger 54 along the refrigerant line 51 connected to the heat exchanger 54.

That is, the multi-way refrigerant valve 1 may expand the refrigerant exhausted to the refrigerant line 51 connected to the heat exchanger 54 and inflow to the heat exchanger 54.

At this time, the heat exchanger 54 may evaporate the refrigerant through the heat-exchange with the coolant supplied from the first cooling apparatus 10 or the second cooling apparatus 20.

Here, the coolant circulating in the first cooling apparatus 10 or the second cooling apparatus 20 increases the temperature while cooling the electrical component 15, the motor 16, or the battery module 30. The coolant with the increased temperature is inflowed into the heat exchanger 54.

At this time, the heat exchanger 54 may recover the waste heat from the coolant through the supplied refrigerant and the heat-exchange of each coolant to be used for the interior heating of the vehicle.

The refrigerant evaporated from the heat exchanger 54 inflows to the second inlet 104 and is exhausted to the fourth outlet 118 through the third connection flow path 213 and the fourth connection flow path 214. The refrigerant exhausted through the fourth outlet 118 passes through the accumulator 57 along the bypass line 64 connected to the accumulator 57. Then, the refrigerant may be supplied from the accumulator 57 to the compressor 59.

By repeating these operations, the heat pump system may heat the vehicle's interior.

Meanwhile, the refrigerant expanded in the first outlet chamber 144 may be exhausted through the first outlet 112 and supplied to the evaporator 58 through the refrigerant line 51 connected to the evaporator 58 along the dehumidifying line 62.

The refrigerant that has passed through the evaporator 58 is supplied to the compressor 59 after passing through the accumulator 57 along the refrigerant line 51.

That is, the evaporator 58 is supplied with the refrigerant expanded through the dehumidifying line 62.

Here, the opening/closing door 52*c* is opened so that the outdoor air which inflows to the HVAC module 52 and passes through the evaporator 58 passes through the internal condenser 52*a*.

The outdoor air inflowed into the HVAC module 52 is dehumidified while passing through the evaporator 58 by the refrigerant in a low temperature state inflowed into the evaporator 58. Then, it is converted to a high temperature state and inflows into the vehicle interior while passing through the internal condenser 52*a*, thereby heating and dehumidifying the vehicle interior.

That is, in the fourth mode, it is possible to heat and dehumidify the interior of the vehicle while repeating the operations as described above.

Therefore, according to the multi-way refrigerant valve 1 and the heat pump system having the same according to an embodiment of the present disclosure configured as described above, a plurality of refrigerant flow paths through which the coolant flows between the outer housing 100 and the inner housing 200 are formed by the rotation of the inner housing 200 according to the mode of the vehicle, thereby the number of refrigerant valves and expansion valves applied to the heat pump system may be minimized, and the simplification of the heat pump system may be promoted.

In addition, the present disclosure may facilitate the control of the refrigerant valve because a plurality of refrigerant flow paths are formed between the outer housing 100 and the inner housing 200 while the inner housing 200 rotates at a predetermined angular interval.

Furthermore, through the simplification of the entire system, it is possible to reduce a manufacturing cost and a weight, and improve space utilization.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

The invention claimed is:

1. A multi-way refrigerant valve comprising:
    an outer housing having an open surface, and comprising a first inlet, a second inlet, and a third inlet, and a first outlet, a second outlet, a third outlet, a fourth outlet, a fifth outlet, and a sixth outlet;
    an inner housing configured to be rotatable inside the outer housing to connect the first, second, and third inlets and the first, second, third, fourth, fifth, and sixth outlets, and including at least one connection flow path formed therein; and
    a cover member mounted to the open surface of the outer housing,
    wherein as the inner housing is rotated at a predetermined interval by a driving unit operated in at least one selected mode, the first inlet is connected to one or both of the first outlet and the second outlet;
    the second inlet is connected to one of the third outlet and the fourth outlet; and the third inlet is connected to one or both of the fifth outlet or the sixth outlet.

2. The multi-way refrigerant valve of claim 1, wherein the outer housing further includes a plurality of chambers in communication with the first, second, and third inlets and with the first, second, third, fourth, fifth, and sixth outlets along the circumferential direction, and partitioned through a partition wall.

3. The multi-way refrigerant valve of claim 2, wherein the plurality of chambers includes:
a first inlet chamber formed on the outer housing and corresponding to the first inlet, a second inlet chamber formed on the outer housing and corresponding to the second inlet, and a third inlet chamber formed in the outer housing and corresponding to the third inlet; and
a first outlet chamber formed in the outer housing and corresponding to the first outlet, a second outlet chamber formed in the outer housing and corresponding to the second outlet, a third outlet chamber formed in the outer housing and corresponding to the third outlet, a fourth outlet chamber formed in the outer housing and corresponding to the fourth outlet, a fifth outlet chamber formed in the outer housing and corresponding to the fifth outlet, and a sixth outlet chamber formed in the outer housing and corresponding to the sixth outlet; and
the first, second, and third inlet chambers and the first, second, third, fourth, fifth, and sixth outlet chambers are communicated with a plurality of connection holes formed along the interior circumference of the outer housing by corresponding to a plurality of connection flow paths.

4. The multi-way refrigerant valve of claim 3, wherein an orifice for expanding refrigerant flowing from the connection flow paths is formed in at least one of the outlet chambers.

5. The multi-way refrigerant valve of claim 3, wherein the plurality of connection flow paths include:
a first connection flow path connecting the first inlet chamber and the first outlet chamber;
a second connection flow path connecting the first inlet chamber and the second outlet chamber;
a third connection flow path connecting the second inlet chamber and the third outlet chamber;
a fourth connection flow path including one end connected to the third connection flow path and an other end connected to the fourth outlet chamber;
a fifth connection flow path connecting the third inlet chamber and the fifth outlet chamber; and
a sixth connection flow path including one end connected to the fifth connection flow path and an other end connected to the sixth outlet chamber.

6. The multi-way refrigerant valve of claim 5, wherein the mode includes a first mode, a second mode, a third mode, and a fourth mode in which the inner housing rotates at a predetermined angle inside the outer housing.

7. The multi-way refrigerant valve of claim 6, wherein in the first mode,
the first inlet is connected to the second outlet through the second connection flow path,
the second inlet is connected to the third outlet through the third connection flow path,
the third inlet is connected to the sixth outlet through the fifth connection flow path and the sixth connection flow path, and
the first outlet, the fourth outlet, and the fifth outlet are closed.

8. The multi-way refrigerant valve of claim 6, wherein in the second mode,
the first inlet is connected to the second outlet through the second connection flow path,
the second inlet is connected to the third outlet through the third connection flow path,
the third inlet is respectively connected to the fifth outlet and the sixth outlet through the fifth connection flow path and the sixth connection flow path, and
the first outlet and the fourth outlet are closed.

9. The multi-way refrigerant valve of claim 6, wherein in the third mode,
the first inlet is connected to the second outlet through the second connection flow path,
the second inlet is connected to the fourth outlet through the third connection flow path and the fourth connection flow path, and
the first outlet, the third outlet, the fifth outlet, and the sixth outlet are closed.

10. The multi-way refrigerant valve of claim 6, wherein in the fourth mode,
the first inlet connects the first connection flow path and the second connection flow path to the first outlet and the second outlet,
the second inlet is connected to the fourth outlet through the third connection flow path and the fourth connection flow path, and
the third outlet, the fifth outlet, and the sixth outlet are closed.

11. The multi-way refrigerant valve of claim 2, wherein the first inlet is positioned between the first outlet and the second outlet in a circumferential on the outer housing;
the second inlet is positioned between the second outlet and the third outlet in the circumferential on the outer housing;
the third inlet is positioned between the fourth outlet and the fifth outlet in the circumferential direction on the outer housing;
the third outlet and the fourth outlet are disposed adjacently along the circumferential direction of the outer housing; and
the fifth outlet, the sixth outlet, and the second outlet are sequentially disposed adjacently along the circumferential direction of the outer housing.

12. The multi-way refrigerant valve of claim 1, wherein a seal member is interposed between the outer housing and the inner housing to prevent the refrigerant from leaking between the outer housing and the inner housing.

13. The multi-way refrigerant valve of claim 1, wherein at least one flow rate control apparatus for controlling the flow rate of the refrigerant exhausted to an outside from at least one of the first to sixth outlets is provided in the outer housing.

14. The multi-way refrigerant valve of claim 13, wherein at least one flow rate control apparatus is provided in each of the first outlet, the second outlet, the fifth outlet, and the sixth outlet.

15. The multi-way refrigerant valve of claim 1, further comprising a driving unit connected to the rotation center of the inner housing, and configured to rotate the inner housing inside the outer housing.

16. A heat pump system for a vehicle, comprising:
a first cooling apparatus including a first radiator and a first water pump connected by a first coolant line, and configured to circulate a coolant in the first coolant line to cool at least one electrical component and at least one motor;

a second cooling apparatus including a second water pump connected to the second coolant line, and configured to circulate a coolant in a second coolant line;

a battery module provided in a battery coolant line that is connected to the second coolant line through a first valve;

an air conditioner device configured to circulate the refrigerant in a refrigerant line and including a multi-way refrigerant valve of claim 1; and a chiller positioned on the battery coolant line configured to pass the coolant, connected to the multi-way refrigerant valve through a refrigerant connection line, and to heat-exchange the inflowing coolant with the refrigerant supplied from the multi-way refrigerant valve to adjust a temperature of the coolant;

wherein the heat exchanger provided in the air conditioner device is connected to the first and second coolant lines so that the coolant circulating in the first and second cooling apparatus passes therethrough; and wherein the inner housing provided in the multi-way refrigerant valve operates in a first mode, a second mode, a third mode, and a fourth mode and that rotates at a predetermined angle inside the outer housing.

17. The heat pump system for the vehicle of claim 16, wherein the air conditioner device includes:

an HVAC module connected from the multi-way refrigerant valve through the refrigerant line, and including an opening and closing door provided inside so that the outdoor air passing through the evaporator is controlled to inflow to the internal condenser according to a cooling, heating, and dehumidifying mode of the vehicle;

a sub-condenser connected to the multi-way refrigerant valve through the refrigerant line;

a compressor connected between the evaporator and the internal condenser through the refrigerant line;

a bypass line connecting the multi-way refrigerant valve and the compressor; and a dehumidifying line connecting the refrigerant line connecting the multi-way refrigerant valve and the evaporator, and the multi-way refrigerant valve, so that the refrigerant passing through the internal condenser inflows from the multi-way refrigerant valve to the evaporator; and when the heat exchanger condenses the refrigerant, the sub-condenser receives the refrigerant condensed in the heat exchanger from the multi-way refrigerant valve and condenses the refrigerant through the heat-exchange with the outdoor air.

18. The heat pump system for the vehicle of claim 17, wherein in the first mode, the multi-way refrigerant valve closes the refrigerant connection line, the bypass line, and the dehumidifying line, and opens the refrigerant line so that the refrigerant supplied from the compressor to the internal condenser passes through the heat exchanger, the sub-condenser, and the evaporator and again inflows to the compressor.

19. The heat pump system for the vehicle of claim 17, wherein in the second mode, the multi-way refrigerant valve opens the refrigerant connection line, closes the bypass line and the dehumidifying line, and opens the refrigerant line, so that the refrigerant supplied from the compressor to the internal condenser passes through the heat exchanger, the sub-condenser, and the evaporator and again inflows to the compressor, and expands the refrigerant exhausted to the refrigerant connection line to inflow to the chiller.

20. The heat pump system for the vehicle of claim 17, wherein in the third mode, the multi-way refrigerant valve closes the refrigerant connection line and the dehumidifying line, opens the bypass line, and opens the refrigerant line except for the refrigerant line connected to the evaporator and the sub-condenser, so that the refrigerant supplied from the compressor to the internal condenser passes through the heat exchanger and inflows back to the compressor, and expands the refrigerant exhausted to the refrigerant line connected to the heat exchanger to inflow the refrigerant to the heat exchanger.

21. The heat pump system for the vehicle of claim 17, wherein in the fourth mode, the multi-way refrigerant valve closes the refrigerant connection line, opens the bypass line and the dehumidifying line, and opens the remaining refrigerant line except for the refrigerant line connected to the evaporator and the sub-condenser so that the refrigerant supplied from the compressor to the internal condenser passes through the heat exchanger and again inflows to the compressor, and expands the refrigerant exhausted to the refrigerant line connected to the heat exchanger to inflow the refrigerant to the heat exchanger.

22. The heat pump system for the vehicle of claim 21, wherein the refrigerant supplied to the dehumidifying line is supplied to the compressor after passing through the evaporator along the refrigerant line connected to the evaporator, and the multi-way refrigerant valve expands the refrigerant that is exhausted into the dehumidifying line so that the refrigerant expanded through the opened dehumidifying line and the dehumidifying line and connected to the refrigerant line is supplied to the evaporator.

* * * * *